US012759902B2

(12) United States Patent
Adamson et al.

(10) Patent No.: US 12,759,902 B2
(45) Date of Patent: Oct. 13, 2026

(54) REGENERATABLE SYSTEM FOR CONTAMINANT REMOVAL

(71) Applicant: Ionic Water Technologies, LLC, Hamilton, NJ (US)

(72) Inventors: George W. Adamson, Hamilton, NJ (US); Melissa Woodward, Hamilton, NJ (US); Cassidy Rae Schneider, Hamilton, NJ (US); Victoria L Korn, Hamilton, NJ (US)

(73) Assignee: IONIC H20 INC., Hamilton, NJ (US)

( * ) Notice: Subject to any disclaimer, the term of this patent is extended or adjusted under 35 U.S.C. 154(b) by 807 days.

(21) Appl. No.: 18/001,978

(22) PCT Filed: Jun. 18, 2021

(86) PCT No.: PCT/US2021/038010
§ 371 (c)(1),
(2) Date: Dec. 15, 2022

(87) PCT Pub. No.: WO2021/257946
PCT Pub. Date: Dec. 23, 2021

(65) Prior Publication Data

US 2023/0227331 A1 Jul. 20, 2023

Related U.S. Application Data

(63) Continuation-in-part of application No. 16/904,706, filed on Jun. 18, 2020, now Pat. No. 11,958,763.
(Continued)

(51) Int. Cl.
*C02F 1/28* (2023.01)
*B01J 20/20* (2006.01)
(Continued)

(52) U.S. Cl.
CPC ............... *C02F 1/283* (2013.01); *B01J 20/20* (2013.01); *B01J 20/28011* (2013.01);
(Continued)

(58) Field of Classification Search
None
See application file for complete search history.

(56) References Cited

U.S. PATENT DOCUMENTS 2,788,319 A 4/1957 Pearson
3,088,909 A 5/1963 Davison
(Continued)

FOREIGN PATENT DOCUMENTS

AU 2019314762 B2 * 3/2025 ........... B01D 61/146
CN 108097224 6/2018
(Continued)

OTHER PUBLICATIONS

Chen et al. (Langmuir, 2004, 20, 2233-2242). (Year: 2004).*
(Continued)

*Primary Examiner* — Clare M Perrin
(74) *Attorney, Agent, or Firm* — Honigman LLP; Andrew N. Weber; Jonathan P. O'Brien

(57) ABSTRACT

A system and method for water purification by capture of contaminants in an aqueous mixture is described herein. A system and method for regenerating the capture system is also described. An integrated capture and regeneration system and method is also described including a separation vessel that houses a capture bed and optionally an electrode in electrical contact with the bed with a power source for applying a voltage to the electrode. The applied voltage enhances capture of the contaminant from aqueous liquid on the capture bed and modulation of the applied voltage enhances release of contaminant on the capture bed into aqueous wash liquid to regenerate the bed. The aqueous
(Continued)

wash liquid may contain a counter ion that binds to the contaminant forming an aggregate contaminant phase that separates from the aqueous wash liquid.

33 Claims, 9 Drawing Sheets

Related U.S. Application Data

(60) Provisional application No. 63/110,952, filed on Nov. 6, 2020.

(51) Int. Cl.

| | |
|---|---|
| ***B01J 20/28*** | (2006.01) |
| ***B01J 20/34*** | (2006.01) |
| ***B01J 47/08*** | (2006.01) |
| ***B01J 49/05*** | (2017.01) |
| ***B01J 49/30*** | (2017.01) |
| ***C02F 1/42*** | (2023.01) |
| ***C02F 1/52*** | (2023.01) |
| *C02F 1/469* | (2023.01) |
| *C02F 101/36* | (2006.01) |

(52) U.S. Cl.

CPC ....... *B01J 20/3416* (2013.01); *B01J 20/3441* (2013.01); *B01J 47/08* (2013.01); *B01J 49/05* (2017.01); *B01J 49/30* (2017.01); *C02F 1/42* (2013.01); *C02F 1/5245* (2013.01); *C02F 1/469* (2013.01); *C02F 2101/36* (2013.01); *C02F 2303/16* (2013.01)

(56) References Cited

U.S. PATENT DOCUMENTS

| | | | | |
|---|---|---|---|---|
| 3,386,912 | A | 6/1968 | Leon | |
| 3,513,664 | A | 5/1970 | Duffney | |
| 3,515,664 | A * | 6/1970 | Johnson | C02F 1/4691 204/627 |
| 3,728,245 | A | 4/1973 | Preis et al. | |
| 3,905,903 | A * | 9/1975 | David | B01J 49/00 210/675 |
| 4,234,419 | A * | 11/1980 | Coillet | C02F 9/00 210/687 |
| 4,804,754 | A | 2/1989 | De Decker et al. | |
| 4,861,490 | A | 8/1989 | Morris | |
| 5,536,389 | A | 7/1996 | Claire | |
| 7,351,820 | B2 | 4/2008 | Thomissen et al. | |
| 10,287,185 | B2 | 5/2019 | Nickelsen et al. | |
| 2008/0035569 | A1 * | 2/2008 | Wilder | C02F 1/003 210/473 |
| 2009/0321336 | A1 | 12/2009 | Girondi | |
| 2013/0082003 | A1 | 4/2013 | Bajpayee et al. | |
| 2013/0284673 | A1 * | 10/2013 | Vaughn | C02F 1/281 210/663 |
| 2015/0175450 | A1 | 6/2015 | Chung et al. | |
| 2019/0185351 | A1 | 6/2019 | Huang et al. | |
| 2019/0185352 | A1 | 6/2019 | Chiang et al. | |
| 2019/0284066 | A1 | 9/2019 | Mullen et al. | |
| 2020/0306726 | A1 | 10/2020 | James et al. | |
| 2021/0008522 | A1 | 1/2021 | Reeve et al. | |
| 2021/0395113 | A1 | 12/2021 | Adamson | |
| 2022/0017385 | A1 | 1/2022 | Yip et al. | |

FOREIGN PATENT DOCUMENTS

| | | | | |
|---|---|---|---|---|
| CN | 112755961 A | | 5/2021 | |
| DE | 102019117327 A1 | | 6/2019 | |
| EP | 0068413 B1 | | 9/1985 | |
| EP | 0915059 | | 5/1999 | |
| KR | 20200110535 A | | 9/2020 | |
| WO | 2004064078 A2 | | 7/2004 | |
| WO | 2005058482 A1 | | 6/2005 | |
| WO | 2005082523 A1 | | 9/2005 | |
| WO | 2015010885 A1 | | 1/2015 | |
| WO | 2017180246 | | 10/2017 | |
| WO | 2017180346 | | 10/2017 | |
| WO | WO-2017180346 A1 | * | 10/2017 | C02F 1/42 |
| WO | 2018036752 A1 | | 3/2018 | |
| WO | 2019106178 A1 | | 6/2019 | |
| WO | 2020001709 | | 1/2020 | |
| WO | 2020041712 A1 | | 2/2020 | |
| WO | 2021257946 A1 | | 12/2021 | |
| WO | 2022140331 A1 | | 6/2022 | |
| WO | 2023114806 A1 | | 6/2023 | |
| WO | 2023114807 A1 | | 6/2023 | |

OTHER PUBLICATIONS

He et al. (Frontiers in Marine Science, 2020, 7, 1-11). (Year: 2020).*
Hwang et al. (Desalination, 2014, 352, 181-189). (Year: 2014).*
Salchi et al. (Front. Chem. Sci. Eng., 2017, 11(4), 575-585). (Year: 2017).*
International Search Report and Written Opinion for PCT/US2022/081502 dated May 10, 2023.
Liang, Shangtao, et al., Electrochemical Oxidation of PFOA and PFOS in Concentrated Waste Streams, Remediation, 28(2), Mar. 1, 2018, pp. 127-134.
Bogeat, Adrian Barroso, "Understanding and Tuning the Electrical Conductivity of Activated Carbon: A State-of-the-Art Review" Taylor & Francis, Clinical Reviews in Solid State and Material Sciences, 2019, Whole Document.
Hinshaw, Gary D. et al., "Granular Activated Carbon (GAC) System Performance Capabilities and Optimization", MRI Project No. 8182-S, Final Report, Report No. AMXTH-TE-CR87111, Prepared for Commander, US Army Toxic and Hazardous Materials Agency, Feb. 27, 1987, Whole Document.
International Search Report and Written Opinion for PCT/US2021/038010 dated Sep. 29, 2021.
International Search Report and Written Opinion for PCT/US2021/064525 dated Mar. 25, 2022.
International Search Report and Written Opinion for PCT/US2022/081501 dated Mar. 2, 2023.
Santos, Danilo H.S. et al., "Saturated activated carbon regeneration by UV-light, H202 and Fenton reaction", Elsevier Science, Amsterdam, NL, vol. 250, May 16, 2020.

* cited by examiner

REGENERATABLE SYSTEM FOR CONTAMINANT REMOVAL

CROSS REFERENCE TO RELATED APPLICATION

This U.S. nonprovisional application is the 35 USC § 371 national phase of PCT Application No. PCT/US2021/038010, filed on Jun. 18, 2021, which claims priority to U.S. utility application Ser. No. 16/904,706, filed Jun. 18, 2020, and U.S. provisional application No. 63/110,952 filed Nov. 6, 2020, the entire contents of each of which are incorporated herein by reference.

TECHNICAL FIELD

The present invention relates to systems and methods for removing ionic contaminants from an aqueous mixture using a capture bed and for regenerating the capture bed for further use.

BACKGROUND

This section provides background information related to the present disclosure and is not necessarily prior art.

Water purification technologies are fundamentally important to everyday life. Contaminants must be removed to purify water to an acceptable level in order for the water to be used as drinking water or for other purposes. Per- and polyfluoroalkyl substances (PFAS) are of particular concern and of particular importance to remove from water. Existing technologies for water purification by removal of contaminants, including PFAS, suffer from issues of efficiency and environmental sustainability. For example, technologies that trap contaminants, such as PFAS, in an ion exchange resin or carbon bed currently require replacement of the bed and disposal of the spent bed to a landfill.

Therefore, while there are existing technologies for removing contaminants such as PFAS (and other similar polyfluorinated hydrocarbons) from water, a need continues to exist for improved technologies that provide more effective removal of contaminants and that are regeneratable for continued use without the need for expensive and inefficient replacement of, and environmentally harmful disposal of, system components.

SUMMARY OF THE INVENTION

In one aspect, disclosed herein is a method of removing a contaminant from an aqueous mixture. The method includes flowing a contaminated aqueous mixture comprising one or more ionic contaminants through a vessel that houses a capture bed and optionally an electrode in electrical contact with the capture bed. The method also optionally includes applying a voltage to the electrode that is in electrical contact with the capture bed, such that the one or more ionic contaminants is bound to the capture bed. The method further includes flowing an aqueous wash liquid through the vessel. The method further optionally includes modulating the voltage applied to the electrode, such that the one or more ionic contaminants bound to the capture bed is released from the capture bed and is washed from the capture bed via the aqueous wash liquid. The aqueous wash liquid may contain a counter ion that binds to the ionic contaminant forming an aggregate contaminant phase that can be removed from the aqueous wash liquid.

In another aspect, disclosed herein is a system for removing a contaminant from water. The system includes a separation vessel and disposed therein a capture bed, and optionally further includes: an electrode in electrical contact with the capture bed, and a power source electrically coupled to, and configured to apply a voltage to, the electrode that is in electrical contact with the capture bed. The system also optionally includes a controller configured to control and modulate the voltage applied from the power source to the electrode. The system further includes an intake line fluidly coupled to the vessel and configured to introduce a flow of a contaminated aqueous mixture to the vessel such that one or more ionic contaminants in the contaminated aqueous mixture binds to the capture bed, and a regeneration line fluidly coupled to the vessel and configured to introduce a flow of aqueous wash liquid to the vessel to wash ionic contaminant from the capture bed.

In another aspect, disclosed herein is a method of regenerating a capture bed. The method includes providing a vessel that houses a capture bed having one or more ionic contaminants bound to the capture bed, and optionally an electrode in electrical contact with the capture bed, and flowing an aqueous wash liquid through the vessel. The method optionally further includes applying a voltage to the electrode, such that the one or more ionic contaminants bound to the capture bed is released from the capture bed and is washed from the capture bed via the aqueous wash liquid. The aqueous wash liquid may contain a counter ion that binds to the ionic contaminant forming an aggregate contaminant phase that can be removed from the aqueous wash liquid.

In another aspect, disclosed herein is a system for regenerating a capture bed. The system includes a capture bed housed within a separation vessel, and optionally further includes: an electrode in electrical contact with the capture bed and a power source electrically coupled to, and configured to apply a voltage to the electrode. The system also optionally includes a controller configured to control and modulate the voltage applied from the power source to the electrode. The system further includes a regeneration line fluidly coupled to the separation vessel and configured to introduce a flow of aqueous wash liquid to the separation vessel to wash ionic contaminant from the capture bed.

Other features and advantages of the invention will be apparent from the following detailed description, figures, and from the claims.

BRIEF DESCRIPTION OF THE DRAWINGS

The following figures are provided by way of example and are not intended to limit the scope of the claimed invention.

DETAILED DESCRIPTION

I. Definitions

Figure 1:
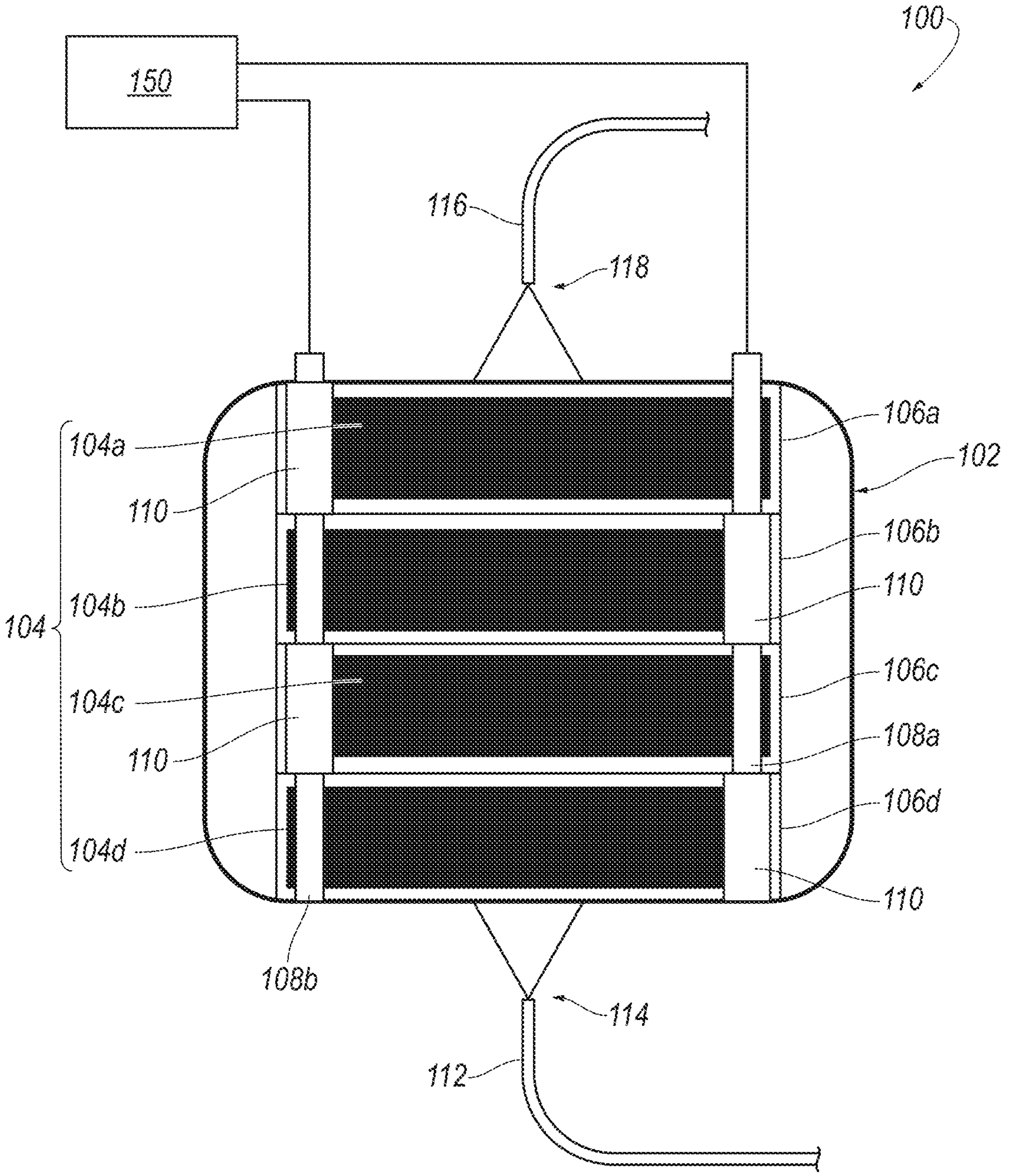
FIG. 1 is an illustration of a capture system for removing contaminants from water according to an embodiment of the invention.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The terms, upper, lower, above, beneath, right, left, etc. may be used herein to describe the position of various elements with relation to other elements. These terms represent the position of elements in an example configuration. However, it will be apparent to one skilled in the art that the elements may be rotated in space without departing from the present disclosure and thus, these terms should not be used to limit the scope of the present disclosure.

As used herein, when an element is referred to as being "on," "engaged to," "connected to," "attached to," or "coupled to" another element, it may be directly on, engaged, connected, attached, or coupled to the other element, or intervening elements may be present. In contrast, when an element is referred to as being "directly on," "directly engaged to," "directly connected to," "directly attached to," or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, the term "electrode" refers to a solid electric conductor that carries electric current to another element, such as a capture bed.

As used herein, the term "activated carbon" refers to a form of carbon processed to have small pores that increase the available surface area.

As used herein "polyfluoroalkyl ion" refers an ionic compound comprising an alkyl chain with multiple fluoro substitutions, which is optionally further substituted, such as with ether, alcohol, amine (including substituted amine), and carboxylic acid groups.

"Per- and polyfluoroalkyl substance" or "PFAS" includes but is not limited to the following substances: perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid, perfluorododecanoic acid, perfluorotridecanoic acid, perfluorotetradecanoic acid, perfluorohexadecanoic acid, perfluorooctadecanoic acid, perfluorobutanesulfonic acid, perfluoropentanesulfonic acid, perfluorohexanesulfonic acid, perfluorooctanesulfonic acid, perfluorononanesulfonic acid, perfluorodecanesulfonic acid, perfluorododecanesulfonic acid, perfluorooctanesulfonamide, N-methylperfluoro-1-octanesulfonamide, N-ethylperfluoro-1-octanesulfonamide, 1H,1H,2H,2H-perfluorohexanesulfonic acid (4:2), 1H,1H,2H,2H-perfluorooctanesulfonic acid (6:2), 1H,1H,2H,2H-perfluorodecanesulfonic acid (8:2), 1H,1H,2H,2H-perfluorododecanesulfonic acid (10:2), N-methyl perfluorooctanesulfonamidoacetic acid, N-ethyl perfluorooctanesulfonamidoacetic acid, 2-(N-methylperfluoro-1-octanesulfonamido)-ethanol, 2-(N-ethylperfluoro-1-octanesulfonamido)-ethanol, tetraluoro-2-(heptafluoropropoxy)propanoic acid ("GenX"), 4,8-dioxa-3H-perfluorononanoic acid, 11-chloroeicosafluoro-3-oxaundecane-1-sulfonic acid, or 9-chlorohexadecafluoro-2-oxanone-1-sulfonic acid. PFAS also includes partial fluorinations. The conjugate bases of these acids are examples of polyfluoroalkyl ions. Capturing PFAS includes capturing a conjugate base of a PFAS.

"PFOS" refers to perfluorooctanesulfonic acid. Capturing/releasing PFOS includes capturing/releasing its conjugate base, perfluorooctanesulfonate.

"PFOA" refers to perfluorooctanoic acid. Capturing/releasing PFOA includes capturing/releasing its conjugate base, perfluorooctanoate.

Systems and methods are described herein. It will be understood that embodiments of the invention described with reference to a system may be applicable to the methods described herein, and vice versa. For example, from a description of a particular carbon bed, such as an activated carbon bed, in a system, it will be understood that the activated carbon bed may be used in a method. Likewise, as another example, from a description of application of a particular voltage in a method, it will be understood that the system may be configured to apply the particular voltage.

II. System for Regenerating a Capture Bed

In one aspect, provided herein is a system for regenerating a capture bed, or a "regeneration system." Regenerating refers to removing ionic contaminant from the capture bed, i.e., contaminant that was bound to the capture bed during a water purification process. Systems and methods for capturing ionic contaminants on a capture bed, and thereby removing them from an aqueous mixture are described herein. As more ionic contaminants are bound to the capture bed the bed becomes less effective at removing the ionic contaminants. Eventually, the contaminants must be released from the capture bed or the capture bed itself must be replaced. Regenerating the capture bed in situ by releasing the bound ionic contaminants allows for continued use of the capture bed without costly replacement and environmentally harmful disposal of the spent capture bed.

The system for regenerating a capture bed includes a capture bed that is housed within a separation vessel. Optionally, the system may be an electrified system with an electrode in electrical contact with a capture bed that is housed within a separation vessel; a power source electrically coupled to, and configured to apply a voltage to the electrode; and a controller configured to control and modulate the voltage applied from the power source to the electrode. By enabling a voltage to be applied to an electrode in electrical communication with the capture bed, the regeneration system is able to apply voltage to the capture bed that drives the release of ionic contaminant from the capture bed.

In some embodiments, the electrode comprises graphite, titanium, stainless steel, cast iron, a conductive metal oxide, a conductive diamond, a titanium suboxide, titanium nitride, titanium carbide, titanium boride, a doped manganese oxide, or mixtures or composites thereof.

The system for regenerating a capture bed also includes a regeneration line fluidly coupled to the separation vessel and configured to introduce a flow of aqueous wash liquid to the separation vessel to wash ionic contaminant from the capture bed. The application of voltage to the electrode together with flow of wash liquid to the capture bed via the regeneration line drives the release of ionic contaminant from the capture bed, resulting in regeneration of the capture bed for further use. In some embodiments, the regeneration line is fluidly coupled to a regeneration line pump and/or a regeneration line valve to control the flow of wash liquid supplied to the separation vessel. In some embodiments, the regeneration system includes a flow controller (e.g., a PLC controller) to control the regeneration line pump and/or regeneration line valve.

In some embodiments, the regeneration system is a subsystem of an integrated capture and regeneration system. Such integrated systems are described below. Integrated systems can be installed at a site as a stand-alone system for providing purified water. Alternatively, the regeneration system may be an add-on system to an existing capture system. For example, there are existing systems for water purification with capture beds, e.g., carbon beds or ion exchange resin beds; the regeneration systems described herein may be installed as an add-on system to provide for in situ regeneration of an existing water purification system. In some embodiments, the regeneration system allows for continued use of the capture bed in the existing system by release, sequestration, and removal of the ionic contaminants in the capture bed.

The following embodiments describe an exemplary installation of an electrified regeneration system onto an existing capture system. In order to apply voltage to an existing capture system, the electrodes are installed by insertion into the existing capture bed, and hooked up to the power source controlled by the controller. A regeneration line is fitted onto the existing piping of the capture system (or directly onto the separation vessel) to add separate inlet and outlet flow of wash liquid into the separation vessel. Valves, e.g., control valves, are installed to control and switch the source of flow into the separation vessel between (1) an aqueous mixture to be purified (during a capture cycle) and (2) a wash liquid to regenerate the capture bed.

In some embodiments, the regeneration system includes concentration and removal of the ionic contaminant released from the capture bed. In some embodiments, a contaminant sequestration agent is employed that can more efficiently be removed from the system than removal of the capture bed. In some embodiments, the sequestration agent is more environmentally friendly to dispose of than disposal of a spent carbon bed or spent ion exchange resin bed (i.e., with bound contaminant).

In some embodiments, the sequestration agent is a counter ion in the wash liquid configured to bind to the ionic contaminant to form an aggregate contaminant phase. Suitable sequestration agents and counter ions are described below. In some embodiments, the system further includes a filter configured to remove the aggregate contaminant phase from the wash liquid. Since the aggregate contaminant phase is sparingly soluble to insoluble in the water phase, the precipitate tends to form a distinct solid or liquid phase that is large enough to either float or sink or be captured in a particulate filter. In some embodiments, a skimmer can be used to capture the aggregate contaminant phase.

In some embodiments, the regeneration system further comprises a regeneration vessel that houses a stationary ion source configured to bind the one or more ionic contaminants in the aqueous wash liquid, wherein the regeneration vessel is fluidly coupled to the separation vessel. In some embodiments, the stationary ion source comprises lime, e.g., a plurality of slaked lime pellets. In some embodiments, the stationary ion source is an alkaline metal coated surface where the surface electrostatically or by dispersion forces reversibly holds the alkaline element until a contaminant can form a precipitate. The contaminant is held at the surface until the surface binding is reversed (e.g., reversing polarity of electrodes).

In some embodiments, the regeneration system further comprises a sequestration agent vessel comprising a sequestration agent in a liquid media. In some embodiments, the regeneration system further comprises a mixing tank for mixing the sequestration agent with the wash liquid and optionally a settler apparatus for collecting solids precipitated from the liquid in the mixing tank. In some embodiments a filter is fluidly coupled to the mixing tank for filtering solids from the mixing tank, for example, solids that were not separated in the settler apparatus.

In some embodiments, the aqueous wash liquid comprises untreated contaminated aqueous mixture. In some embodiments, the aqueous wash liquid comprises a $C_{1-5}$ alcohol. In some embodiments, the aqueous wash liquid further comprises an antifreeze agent that lowers the freezing point of the aqueous wash liquid. In some embodiments, the antifreeze agent is selected from the group consisting of propylene glycol, polypropylene glycol, polyethylene glycol, glycerol, polyvinyl alcohol, carboxymethylcellulose, ribose, sucrose, glucose, rhamnose, xylose, fructose, raffinose, stachyose, low molecular weight hydroxyethyl starches, maltodextrin, cellodextrins, and any mixture thereof. In some embodiments, the aqueous wash liquid comprises from about 0.1 wt % to about 20 wt % of the antifreeze agent (e.g., about 1 to about 10 wt % of the antifreeze agent). In some embodiments, the freezing point of the aqueous wash liquid is below about −0.3° C. In some embodiments, the antifreeze agent encourages slush formation of the aqueous wash liquid at freezing temperatures.

In some embodiments, the aqueous wash liquid further comprises one or more additives for cleaning the capture bed of scale and/or inorganic precipitate. Inorganic precipitate may comprise, for example, iron or manganese. In some embodiments, the one or more additives are selected from the group consisting of acetic acid, propanoic acid, octanoic acid, glycolic acid, citric acid, ethylenediaminetetraacetic acid (EDTA), a water-soluble fatty acid, a salt of the aforementioned acids (e.g., a sodium or potassium salt), and any mixture thereof. In some embodiments, the acid is configured to solubilize inorganic precipitates or scale on the capture bed, e.g., at or near the leading edge of the capture bed. In some embodiments, the pH of the aqueous wash liquid with the additive(s) is from about 0 to about 6. In some embodiments, the pH of the aqueous wash liquid with the additive(s) is from about 3 to about 6. In some embodiments, the concentration of the additive(s) in the aqueous wash liquid is from about 0.1 wt % to about 15 wt %, or up to the limit of solubility of the acid in the wash liquid.

In some embodiments, the system further comprises a second wash liquid that can be used to rinse the capture bed before, after, or simultaneously with the aqueous wash liquid; the second wash liquid may be referred to as a "rinse liquid." The rinse liquid may be introduced to the vessel via a rinse liquid line. The rinse liquid is an aqueous liquid comprising one or more additives for cleaning the capture bed of scale and/or inorganic precipitate. In some embodiments, the one or more additives are selected from the group consisting of acetic acid, propanoic acid, octanoic acid, glycolic acid, citric acid, ethylenediaminetetraacetic acid (EDTA), a water-soluble fatty acid, a salt of the aforementioned acids (e.g., a sodium or potassium salt), and any mixture thereof. In some embodiments, the pH of the rinse liquid is from about 3 to about 6. In some embodiments, the concentration of the additive(s) in the rinse liquid is from about 0.1 wt % to about 15 wt %, or up to the limit of solubility of the acid in the rinse liquid.

Figures 2A, 2B:
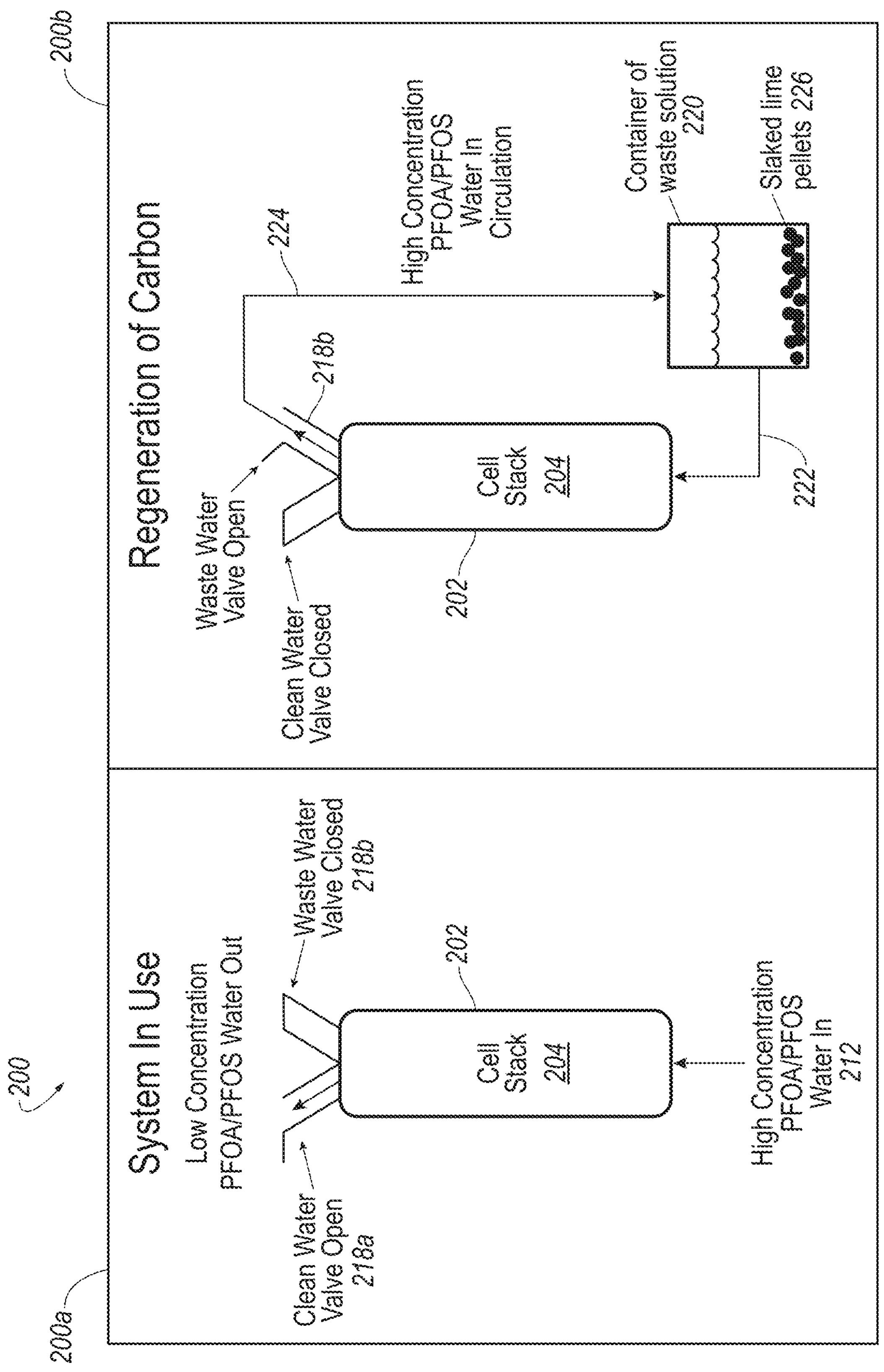
FIGS. 2A and 2B are a schematic of a capture system (2A) and regeneration system (2B) according to another embodiment of the invention.

FIG. 2 is a schematic for an exemplary system 200 according to another embodiment of the present invention. FIG. 2A shows a capture system 200*a* in use for capturing contaminants, specifically PFOA and/or PFOS, from a water source, which is described in detail below. FIG. 2B shows a regeneration system 200*b*. The regeneration system as schematically shown in FIG. 2B may be part of an integrated capture and regeneration system or may be an add-on regeneration system. A regeneration vessel 220 comprising wash liquid ("container of waste solution") is fluidly coupled via a regeneration line 222 to the separation vessel 202 that houses the capture bed, specifically a capture bed stack 204 ("cell stack") and is configured to flow wash liquid through the separation vessel 202. A regeneration outlet line 224 is fluidly coupled to the opposite end of the separation vessel. A valve 218*b* controls flow out of the separation vessel via the regeneration outlet line 224. The regeneration outlet line 224 is fluidly coupled to the regeneration vessel 220 thus completing the circulation loop. The system 200*b* is configured to recirculate the wash liquid through the separation vessel 202 multiple times resulting in a wash liquid with high concentration of contaminant (e.g., PFOA/PFOS). The regeneration vessel 220 contains a stationary ion source 226, which are slaked lime pellets as shown in this embodiment. The slaked lime pellets 226 are configured to bind to the PFOA/PFOS in the regeneration vessel 220. Slaked lime pellets 226 can easily be removed from the system for disposal. Disposal of slaked lime pellets is more economical and environmentally friendly than disposal of an activated carbon bed or ion exchange resin bed.

III. Method for Regenerating a Capture Bed

Another aspect provided herein is a method for regenerating a capture bed, or a "regeneration method." The method of regenerating a capture bed includes providing a vessel that houses a capture bed having one or more ionic contaminants bound to the capture bed, and optionally an electrode in electrical contact with the capture bed. The vessel may be part of an integrated capture and regeneration system that includes a system for capturing a contaminant, as described below. Alternatively, the vessel may be part of an existing contaminant capture system (water purification system), wherein the regeneration method is performed on the existing vessel/capture system by installing a regeneration system (as described above) onto the existing vessel/capture system.

The method of regenerating a capture bed further includes flowing an aqueous wash liquid through the vessel and optionally applying a voltage to the electrode, such that the one or more ionic contaminants bound to the capture bed is released from the capture bed and washed from the bed via the aqueous wash liquid.

In some embodiments, the aqueous wash liquid is flowed into the separation vessel at a rate of from about 5 to about 400 liters per minute per square meter of capture bed to release bound ionic contaminant from the capture bed and wash the release ionic contaminant out of the capture bed.

In some embodiments, a voltage is applied to the electrode. In some embodiments, a voltage having a positive polarity of from about 0.01 V to about 1.5 V (e.g., about 0.01 V to about 1.2 V) is applied to the electrode in order to drive the release of the ionic contaminant from the capture bed to be washed away by the wash liquid. In some embodiments, a voltage having a negative polarity of from about −0.01 V to about −1.6 V is applied to the electrode in order to drive the release of the ionic contaminant. In some embodiments, an AC voltage is applied, optionally with a DC offset, to drive release of the ionic contaminant. In some embodiments, no voltage is applied.

In some embodiments, the wash liquid comprises a sequestration agent. In some embodiments, the sequestration agent is a counter ion. In some embodiments, the counter ion is a cation selected from $Ca^{2+}$, $Mg^{2+}$, $Zn^{2+}$, $Sr^{2+}$, $Al^{3+}$, $B^{3+}$, $Al^{3+}$, or $Fe^{3+}$. Cations are suitable for use in regenerating a capture bed with a bound anionic contaminant, such as perfluoroalkyl anions, or phosphate or borate contaminants. In some embodiments, the counter ion is Ca'. In some embodiments, the counter ion is $Al^{3+}$. In some embodiments, the counter ion is supplied to the wash liquid by addition of calcium hydroxide, calcium oxide, or calcium chloride to the wash liquid. In some embodiments, the wash liquid is basic and the source of $Ca^{2+}$ is calcium hydroxide. In some embodiments, the wash liquid is acidic and the source of $Ca^{2+}$ is calcium chloride. In some embodiments, the counter ion is supplied to the wash liquid by addition of aluminum hydroxide. In some embodiments, the counter ion is supplied to the wash liquid by addition of a mixture of aluminum hydroxide and sodium hydroxide. In some embodiments, the counter ion is supplied to the wash liquid by addition of $NaAl(OH)_4$ sodium aluminate.

In some embodiments, the pH of the aqueous wash liquid is modulated to cause the aggregate contaminant phase to precipitate from the aqueous wash liquid. For example, lime or other hydroxide can be added to the aqueous wash liquid to change the pH. Sodium hydroxide, carbon dioxide, bicarbonate, phosphoric acid, and sulfuric acid may also be used as pH modulating agents. In some embodiments, the pH is modulated distal to (i.e., downstream of) the capture bed. pH modulation may be accomplished with a lime wash of the column by bubbling carbon dioxide or adding bicarbonate in another tank upstream of the capture bed; this lowers the pH from the $Ca(OH)_2$ solution to a neutral or near neutral pH and improves the aggregate size of the precipitate by co-precipitating calcium carbonate with the perfluoroalkyl compounds. Alternatively, phosphoric acid and sulfuric acid may also be introduced to form salts with calcium and act as neutralizing agents. In some embodiments, the wash liquid comprises sodium hydroxide.

In some embodiments, the counter ion is an anion selected from a phosphate, a sulfate, or a borate. Anions are suitable for use in regenerating a capture bed with a bound cationic contaminant, such as perfluoroalkyl cations. In some embodiments the counter ion is supplied to the wash liquid by addition of calcium phosphate, calcium borate, calcium sulphate, magnesium phosphate, magnesium borate, or magnesium sulphate to the wash liquid.

In some cases, perfluoroalkyl compounds may be non-ionic and must first be partially decomposed before they can be released using the counter ion. In such instances, the regeneration method further comprises partially decomposing the nonionic perfluoroalkyl compound(s), such as by chemical, photochemical, electrochemical decomposition or by application of DC or AC electrical discharge.

In some embodiments, upon flowing the wash liquid comprising the sequestration agent through the separation vessel, the sequestration agent and the released ionic contaminant form an aggregate contaminant phase. In some embodiments, the aggregate contaminant phase separates from the aqueous wash liquid by precipitation. In other embodiments, the aggregate contaminant phase forms a foam. In other embodiments, the aggregate contaminant phase forms a dispersed phase within the aqueous wash liquid.

In some embodiments, the aqueous wash liquid is at least substantially saturated with the ionic contaminant upon exiting the capture bed.

In some embodiments, the regeneration method comprises adding a sequestration agent to the wash liquid. In some embodiments, a sequestration agent vessel is provided containing the sequestration agent in liquid media (e.g., aqueous media) and the sequestration agent is flowed from the sequestration agent vessel to be added to the wash liquid. The flow may be controlled by a pump and/or valve. In some embodiments, the sequestration agent is mixed with the wash liquid, for example in a mixing tank. In some embodiments, the wash liquid mixed with the sequestration agent is wash liquid that is substantially saturated with the ionic contaminant.

In some embodiments, a rinse liquid comprising additive(s), as described above, is flowed through the vessel and the capture bed. The rinse liquid may be used before, after, or simultaneously with the aqueous wash liquid. In some embodiments, the method further comprises removing, and optionally solubilizing, inorganic precipitates or scale on the capture bed, e.g., at or near the leading edge of the capture bed.

In some embodiments, the regeneration method further comprises contacting the released ionic contaminant in the aqueous wash liquid with a stationary ion source, such that the ionic contaminant is bound to the stationary ion source forming an aggregate contaminant phase.

In some embodiments, the regeneration method further comprises removal of the aggregate contaminant phase. In some embodiments, removal of the aggregate contaminant phase comprises filtering the aggregate contaminant phase from the wash liquid.

In some embodiments, the regeneration method further comprises disposal of the removed aggregate contaminant phase, e.g., to a landfill. The aggregate contaminant phase may also be destroyed, e.g., by calcination, thermal decomposition, or vitrification. In some embodiments, the regeneration method further comprises electrochemical oxidation of the wash liquid.

In some embodiments, the regeneration method further comprises pre-oxidizing the ionic contaminant comprising converting alcohol groups of the ionic contaminant to carboxylic acid groups by chemical or electrochemical means.

In some embodiments, the ionic contaminant comprises an organic end with an ionic moiety. In some embodiments, the ionic contaminant is selected from the group consisting of a polyfluoroalkyl ion, a borate, a phosphate, a polyphosphate, a sulfate, an organic acid, a fatty acid, a humic substance, a shortchain PFAS, a water-soluble medication, a detergent, a water-soluble insecticide, a water-soluble fungicide, a water-soluble germicide, and any combination thereof. In some embodiments, the ionic contaminant is a polyfluoroalkyl ion. In some embodiments, the polyfluoroalkyl ion is perfluorooctanesulfonate or perfluorooctanoate. Perfluorooctanesulfonate is the conjugate base of perfluorooctanesulfonic acid (PFOS). Perfluorooctanoate is the conjugate base of perfluorooctanoic acid (PFOA). In some embodiments, the polyfluoroalkyl ion is perfluorobutanesulfonate or perfluorobutanoate. Perfluorobutanesulfonate is the conjugate base of perfluorobutanesulfonic acid (PFBS). Perfluorobutanoate is the conjugate base of perfluorobutanoic acid (PFBA).

The system of FIG. 2B can also be described in terms of a regeneration method of which it illustrates. Wash liquid ("waste solution") is flowed to a separation vessel that houses a capture bed ("cell stack") and flows through the vessel. Ionic contaminants bound to the cell stack are released as wash liquid flows through the vessel and voltage is applied (not shown) to the cell stack. A valve ("waste water valve") is opened to direct flow of wash liquid with released ionic contaminant (PFOA and/or PFOS) to a regeneration vessel ("container of waste solution") via a regeneration outlet line. A stationary ion source (slaked lime pellets in this embodiment) binds the PFOA/PFOS. The slaked lime pellets with bound PFOA/PFOS can be removed from the system and disposed of.

IV. System for Capturing a Contaminant

Another aspect provided herein is a system for capturing an ionic contaminant, or a "capture system." The capture system includes a separation vessel that houses a capture bed configured to capture ionic contaminants in an aqueous mixture flowed through the separation vessel. In some embodiments, the system also provides for regeneration of the capture bed as an integrated capture and regeneration system, or an "integrated system." The integrated system may include any of the features of a regeneration system and/or capture system as described herein.

The capture system includes: a separation vessel and disposed therein a capture bed; and an intake line fluidly coupled to the vessel and configured to introduce a flow of a contaminated aqueous mixture to the vessel such that one or more ionic contaminants in the contaminated aqueous mixture binds to the capture bed; and optionally further includes an electrode in electrical contact with the capture bed, a power source electrically coupled to, and configured to apply a voltage to, the electrode that is in electrical contact with the capture bed, and a controller configured to control and modulate the voltage applied from the power source to the electrode.

The integrated capture and regeneration system includes a capture system and further includes a regeneration line fluidly coupled to the vessel and configured to introduce a flow of aqueous wash liquid to the vessel to wash ionic contaminant from the capture bed.

In some embodiments, the capture system further includes a pump fluidly coupled to the intake line and configured to pump the contaminated aqueous mixture into the separation vessel. In some embodiments, the capture system further includes a valve fluidly coupled to the intake line and configured to control the flow of the contaminated aqueous mixture into the separation vessel.

In some embodiments, the system is a non-electrified system.

In some embodiments, the system is an electrified system with an electrode, power source, and controller as described herein. In some embodiments, the controller is configured to reduce or reverse the current applied from the power source. In some embodiments, the controller is further configured to reduce the voltage applied to the electrode, reverse the polarity of the voltage applied to the electrode, terminate the voltage applied to the electrode, or any combination thereof. As described in the methods below, the power source is configured to apply a first voltage to the electrode during flow of contaminated aqueous mixture to capture bed (during a capture cycle). During flow of wash liquid to the capture bed (during a regeneration cycle), terminating, reducing or reversing the current helps to drive the release of the bound contaminant from the capture bed.

In some embodiments, the capture bed (e.g., activated carbon bed) is surface-modified with functional groups selected from the group consisting of an acid, a hydroxide, a chloride, a bromide, a fluoride, an ether, an epoxide, a quinone, a ketone, an aldehyde, a pyrrole, a thiophene, and any combination thereof.

In some embodiments, the capture bed is at least partially conductive. In some embodiments, the capture bed is porous. In some embodiments, the capture bed is an activated carbon bed. In some embodiments, the capture bed is an ion exchange resin bed. In some embodiments, the capture bed is a composite of activated carbon and ion exchange resin. In some embodiments, the capture bed is an activated carbon metal oxide composite. In some embodiments, the capture bed is a FILTRASORB® activated carbon bed from Calgon Carbon. In some embodiments, the capture bed comprises black pearls 200 (activated graphite) from Cabot corporation. In some embodiments, the capture bed comprises PBX51 (activated graphite) from Cabot corporation.

In some embodiments, the capture bed comprises powder, granules, beads, pellets, cloths, felts, nonwoven fabrics, or composites comprising a material selected from carbon, nitrogen-doped carbon, boron-doped carbon, charcoal, graphite, biochar, coke, carbon black, or any combination thereof. In some embodiments, the capture bed comprises activated charcoal powder, granules, pellets, beads, or any combination thereof.

In some embodiments, the capture bed comprises activated carbon having an average surface area of from about 100 $m^2/g$ to about 2000 $m^2/g$. In some embodiments, the capture bed has a conductivity of from about 0.01 S/cm to about 100 S/cm. In some embodiments, the capture bed has a porosity of from about 30% to about 95%.

In some embodiments, the capture bed is surface-modified with functional groups selected from the group consisting of an acid, a hydroxide, a chloride, a bromide, a fluoride, an ether, an epoxide, a quinone, a ketone, an aldehyde, a pyrrole, a thiophene, and any combination thereof. In some embodiments, the capture bed has an ionic complexing species bound to it. In some embodiments, the ionic complexing species is $Ca^{2+}$, $Mg^{2+}$, $Al^{3+}$, phosphate, borate, or silicate. In some embodiments, the ionic complexing species is an alkaline ion mixed with fatty acid or wax.

In some embodiments, the capture bed further comprises a binder dispersed in the capture bed. In some embodiments, the binder comprises a wax, a starch, a sugar, a polysaccharide, or any combination thereof. In some embodiments, the wax is a polyethylene wax. In some embodiments, the wax is carnauba wax.

In some embodiments, the capture bed is disposed longitudinally along the flow axis of the separation vessel such that the contaminated aqueous mixture flows by the capture bed. In other embodiments, the capture bed is disposed laterally across the separation vessel such that the water flows through the capture bed.

In some embodiments, the capture bed is adjacent to a separator. In some embodiments, the capture bed is wrapped in a separator, enclosed within a separator, or sandwiched between two separators.

In some embodiments, the capture system further comprises a second separation vessel that houses a second capture bed and a second electrode in electrical contact with the second capture bed. In some embodiments, the power source or a second power source is configured to apply a voltage to the second electrode that is in electrical contact with the second capture bed.

In some embodiments, the separation vessel further houses a second capture bed and a second electrode in electrical contact with the second capture bed. In some embodiments, the second capture bed is adjacent to the first capture bed with a separator disposed between the first and second capture beds. In some embodiments, the separator is disposed around the first and second capture beds in a Z-fold, S-fold, or C-fold arrangement. In some embodiments, the separator is disposed around one or more capture beds in a spiral wound or jelly roll configuration. In some embodiments, the power source is configured to apply a positive voltage to one of the first and second capture beds, and a negative voltage to the other of the first and second capture beds.

In some embodiments, the separation vessel comprises a stack comprising a plurality of capture beds. In some embodiments, the plurality of capture beds in the stack are separated from each other by one or more separators. In some embodiments, the plurality of capture beds are in electrical contact with the first or second electrode.

In some embodiments, the power source is configured to apply a positive voltage to the first electrode, wherein the first electrode is in electrical contact with a first plurality of capture beds, and wherein the power source is configured to apply a negative voltage to the second electrode, wherein the second electrode is in electrical contact with a second plurality of capture beds.

In some embodiments, the first plurality of capture beds are stacked in an alternating fashion with the second plurality of capture beds.

In some embodiments, the vessel is a pipe, column, or tank.

In some embodiments, the separator comprises a porous plastic. In some embodiments, the porous plastic is a plastic mesh. In some embodiments, the separator comprises an inert material. Suitable materials for the separator include nylon, polyamide, polypropylene, and HDPE.

FIG. 1 illustrates an exemplary capture system according to an embodiment of the present invention. In this embodiment, a separation vessel or column 102 (e.g., PVC pipe) houses a stack 104 of carbon powder capture beds 104*a-d*. The stack 104 is arranged with each carbon powder capture bed 104*a-d* wrapped in a non-woven separator 106*a-d*. Stacks can be added, and the column 102 lengthened, to fit the desired amount of carbon. The stack 104 is configured with the wrapped carbon power capture beds 104*a-d* disposed laterally across the vessel 102 such that flow through the vessel 102 will flow through each capture bed 104*a-d* of the stack 104. Electrodes 108 (or "current collectors") made of graphite filled polymer are in electrical contact with the carbon powder capture beds 104*a-d*. The electrodes 108 are electrically coupled to a power source 150 A first electrode 108*a* is inserted longitudinally through the stack 104 and is in electrical contact with a first 104*a* and third 104*c* capture bed of the stack, but is electrically insulated from a second 104*b* and fourth 104*d* capture bed of the stack. Non-conductive tape 110 is wrapped around a portion of the first electrode 108*a* in its electrically insulated areas in the second and fourth capture bed. A second electrode 108*b* is inserted longitudinally (and separated from the first electrode 108*a*) through the stack 104 and is in electrical contact with the second 104*b* and fourth 104*d* capture bed of the stack, but is electrically insulated from the first 104*a* and third 104*c* capture bed. Non-conductive tape 110 is wrapped around a portion of the second electrode 108*b* in its electrically insulated areas in the first 104*a* and third 104*c* capture bed. An intake line 112 is fluidly coupled to a first end of the separation vessel 102 and an outlet line 116 is fluidly coupled to a second end of the separation vessel 102. The inlet line 112 includes an inlet valve 114. The outlet line 116 includes an outlet valve 118.

FIG. 2 is a schematic for exemplary system 200 according to another embodiment of the present invention. FIG. 2A shows a capture system 200*a* in use for capturing contaminants, specifically PFOA or PFOS, from a water source. An intake line 212 is fluidly coupled to a vessel 202 that houses a cell stack 204 and configured to supply water in need of treatment due to high concentration of PFOA and/or PFOS (e.g., having levels PFOA and/or PFOS above the upper limit as defined by EPA or other regulatory body) into the vessel 202. The cell stack 204 comprises capture beds in a stack, optionally with separator between the beds. An outlet has valves 218*a*, 218*b* for a clean water outlet and a waste water (i.e. wash liquid) outlet. FIG. 2B shows a regeneration system 200*b* as described above. The regeneration system of FIG. 2B may be installed together with the system of FIG. 2A as part of an integrated system.

Figure 3:
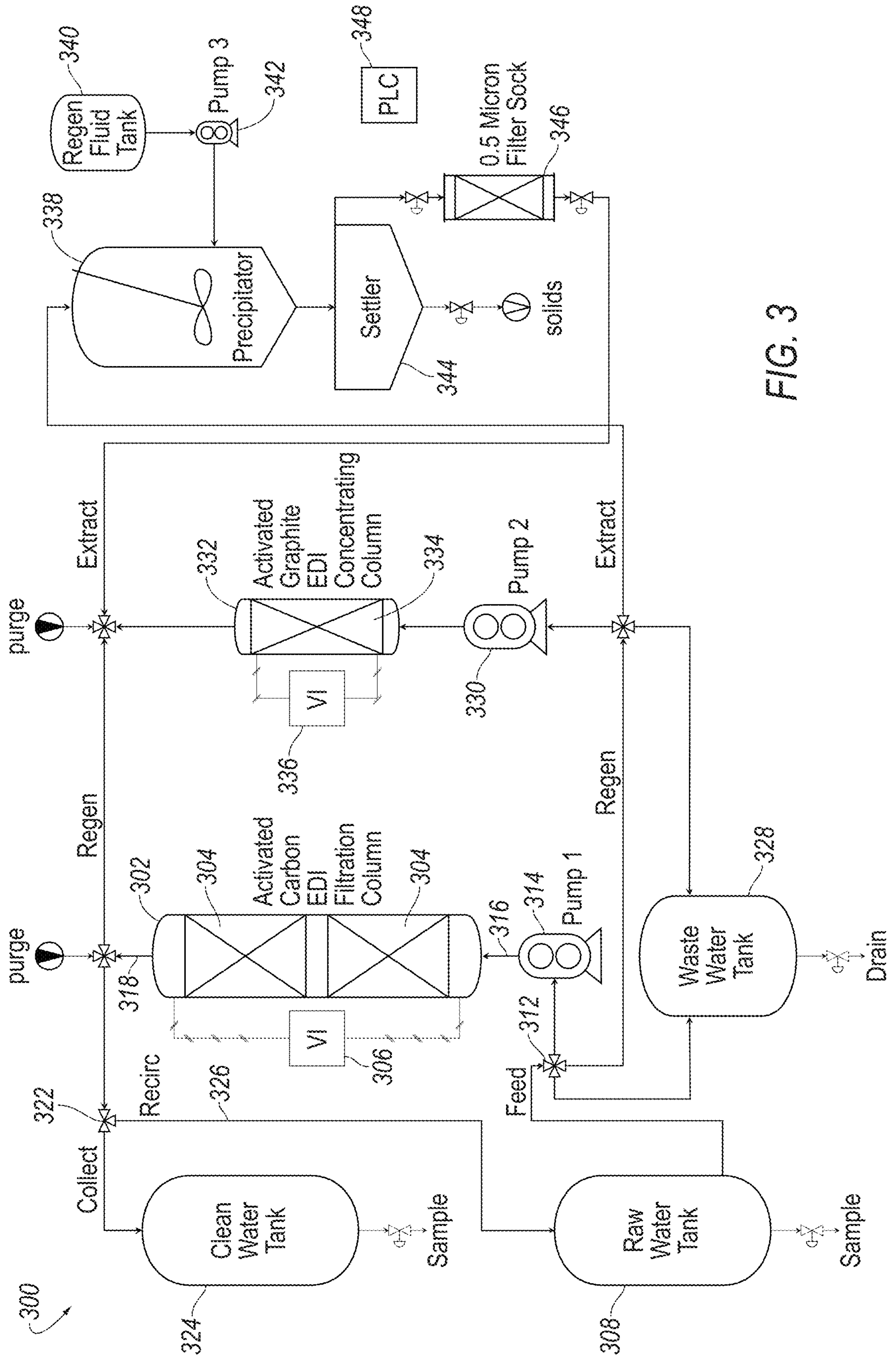
FIG. 3 is a process diagram of an integrated capture and regeneration system according to another embodiment of the invention.

FIG. 3 is a process diagram for an exemplary integrated system 300 according to another embodiment of the present invention. In this embodiment, a raw water tank 308 contains the contaminated aqueous mixture in need of ionic contaminant removal. The raw water tank 308 is fluidly coupled to a pump 314 ("pump 1") with an intervening valve 312 to control flow. Pump 1 314 is fluidly coupled to the inlet 316 of a separation vessel 302 (e.g., an activated carbon EDI filtration column) that houses activated carbon capture beds 304. A voltage/current source 306 is electrically coupled to the capture beds 304 of the separation vessel 302. The outlet 318 of the column 302 is fluidly coupled to a clean water tank 324 with an intervening valve 322. The intervening valve 322 is also fluidly coupled to the raw water tank 308 via recirculation line 326 providing for optional recirculation of the liquid for one or more additional cycles of contaminant removal. The raw water tank 308 is also fluidly coupled to another pump 330 ("pump 2") via the same intervening valve 312 that controls flow into pump 1 314. Pump 2 330 is fluidly coupled to a second separation vessel 332 (an activated graphite EDI concentrating column) that houses an activated graphite capture bed 334. A voltage/current 336 source is electrically coupled to the activated graphite bed 334. The second separation vessel 332 is fluidly coupled to the clean water tank 308 and to the recirculation valve 322.

Still referring to FIG. 3, a regeneration vessel 328 (waste water tank) containing wash liquid is fluidly coupled to both Pump 1 314 and Pump 2 330 and both separation vessels 302, 332. The wash liquid upon flowing through the capture beds 304 and/or 334 can be referred to as extract and is fluidly coupled to a precipitator 338. The precipitator 338 is also fluidly coupled to a regeneration fluid tank 340 via another pump 342 ("Pump 3"). The regeneration fluid tank 340 contains a counter ion in a liquid media. The precipitator 338 is fluidly coupled to a settler 344 for removing precipitated solids from the extract upon mixing with the counter ion. The settler 344 is also fluidly coupled to a filter 346 for further removal of solids from the liquid phase exiting the settler. The system 300 can be controlled by a PLC controller 348.

V. Method for Capturing a Contaminant

Another aspect provided herein is a method for capturing an ionic contaminant, or a "capture method." The capture method includes flowing an aqueous mixture comprising one or more ionic contaminants through a separation vessel that houses a capture bed in order to bind the one or more ionic contaminants to the capture bed, thereby removing the one or more ionic contaminants from the aqueous mixture. In some embodiments, the method includes regeneration of the capture bed as part of an integrated capture and regeneration method, or an "integrated method."

In some embodiments, the capture method further includes applying a voltage to the electrode that is in electrical contact with the capture bed, such that the one or more ionic contaminants is bound to the capture bed. The applied voltage enhances the binding of the one or more ionic contaminants to the capture bed. Methods with application of voltage are referred to as electrified methods.

The integrated method further includes a regeneration cycle comprising flowing an aqueous wash liquid through the separation vessel and optionally, in electrified methods, modulating the voltage applied to the electrode, such that the one or more ionic contaminants bound to the capture bed is released from the capture bed and is washed from the capture bed via the aqueous wash liquid. The modulated voltage helps to drive the release of the bound ionic contaminant from the capture bed. The integrated method, specifically the regeneration cycle thereof, may include any of the steps and features of the regeneration method described above.

In some embodiments, applying the voltage to the electrode comprises running an electrical current to the electrode, and modulating the voltage comprises reducing or reversing the electrical current running to the electrode. In some embodiments, the voltage applied to the electrode during capture of contaminants has a positive polarity from about 0.01 V to about 2.2 V. In some embodiments, the voltage applied to the electrode during capture of contaminants has a positive polarity from about 0.01 V to about 1.6 V. In some embodiments, modulating the voltage to release the ionic contaminant comprises reducing the electric current to generate a modulated voltage having a positive polarity of from about 0.01 V to about 1.5 V (e.g., about 0.01 V to about 1.2 V). In some embodiments, modulating the voltage to release the ionic contaminant comprises reversing the electric current to generate a modulated voltage having a negative polarity of from about −0.01 V to about −2.2V or from about −0.01 V to about −1.6 V. In some embodiments, modulating the voltage to release the ionic contaminant comprises applying an AC voltage optionally with a DC offset.

In some embodiments, the contaminated aqueous mixture is flowed into the vessel at a rate from about 5 to about 400 liters per minute per square meter of capture bed. In some embodiments, the contaminated aqueous mixture is flowed into the vessel at a rate from about 80 to about 240 liters per minute per square meter of capture bed. In some embodiments, the contaminated aqueous mixture is flowed into the vessel at a rate from about 0.01 to about 10 liters per minute per kilogram of capture bed. In some embodiments, the capture bed has a mass of from about 4,000 to about 10,000 kilograms. In some embodiments, the pressure drop across the capture bed is from about 1 psi to about 200 psi.

In some embodiments, the aqueous wash liquid is flowed into the vessel at a rate from about 5 to about 400 liters per minute per square meter of capture bed. In some embodiments, the aqueous wash liquid is flowed into the vessel at a rate from about 80 to about 240 liters per minute per square meter of capture bed. In some embodiments, the aqueous wash liquid is flowed into the vessel at a rate from about 0.01 to about 10 liters per minute per kilogram of capture bed.

In some embodiments, the capture method further comprises binding an ionic complexing species to the capture bed prior to flowing the contaminated aqueous mixture through the vessel, such that upon flowing the contaminated aqueous mixture through the vessel, the ionic contaminant binds to the capture bed by forming a complex with the ionic complexing species wherein the complex is bound to the capture bed. In some embodiments, the ionic complexing species is $Ca^{2+}$, $Mg^{2+}$, phosphate, borate, or silicate. In some embodiments, the ionic complexing species is an alkaline ion mixed with fatty acid or wax.

In some embodiments, the capture bed is situated in the vessel such that the contaminated aqueous mixture flows by the capture bed. In some embodiments, the capture bed is situated in the vessel such that the contaminated aqueous mixture flows through the capture bed.

In some embodiments, the capture method further includes flowing the contaminated aqueous mixture through a second vessel that houses a second capture bed and a second electrode in electrical contact with the second capture bed and applying a voltage to the second electrode that is in electrical contact with the second capture bed.

In some embodiments, the vessel further houses a second capture bed and a second electrode in electrical contact with the second capture bed and the capture method further includes applying a voltage to the second electrode that is in electrical contact with the second capture bed. In some embodiments, the second capture bed is adjacent to the first capture bed with a separator disposed between the first and second capture beds. In some embodiments, a positive voltage is applied to one of the first and second capture beds, and a negative voltage is applied to the other of the first and second capture beds.

In some embodiments, the vessel comprises a capture bed stack comprising a plurality of capture beds. In some embodiments, the plurality of capture beds are separated from each other by one or more separators. In some embodiments, the plurality of capture beds are in electrical contact with the first or second electrode. In some embodiments, the capture method further comprises applying a positive voltage to the first electrode, wherein the first electrode is in electrical contact with a first plurality of capture beds; and applying a negative voltage to the second electrode, wherein the second electrode is in electrical contact with a second plurality of capture beds. In some embodiments, the first plurality of capture beds are stacked in an alternating fashion with the second plurality of capture beds.

In some embodiments, the capture method further comprises surface-modifying the capture bed with a functional group selected from the group consisting of an acid, a hydroxide, a chloride, a bromide, a fluoride, an ether, an epoxide, a quinone, a ketone, an aldehyde, a pyrrole, a thiophene, and any combination thereof.

In some embodiments, the ionic contaminant comprises an organic end with an ionic moiety. In some embodiments, the ionic contaminant is selected from the group consisting of a polyfluoroalkyl ion, a borate, a phosphate, a polyphosphate, a sulfate, an organic acid, a fatty acid, a humic substance, a shortchain PFAS, a water-soluble medication, a detergent, a water-soluble insecticide, a water-soluble fungicide, a water-soluble germicide, and any combination thereof. In some embodiments, the ionic contaminant is a polyfluoroalkyl ion. In some embodiments, the polyfluoroalkyl ion is perfluorooctanesulfonate or perfluorooctanoate.

In some embodiments, the contaminated aqueous mixture further comprises inorganic contaminants. In some embodiments, the inorganic contaminants include iron or manganese. In some embodiments, the inorganic contaminants in the contaminated aqueous mixture result in scale formation or inorganic precipitate formation on the capture bed; the scale or inorganic precipitate can be removed by the use of one or more additives in the wash liquid or in a separate rinse liquid. In some embodiments, the use of the additive(s) reduces the amount of time needed to regenerate the capture bed and/or reduces the volume of wash liquid needed to regenerate the capture bed.

The system of FIG. 2A can also be described in terms of a capture method of which it illustrates. Water comprising a high concentration of PFOA and/or PFOS contaminant is flowed into a separation vessel that houses a plurality of capture beds in a stack ("cell stack"). As the water flows through the cell stack the PFOA and/or PFOS ionic contaminant is bound to the capture bed. With the bound contaminant removed from the flow of water through the separation vessel, water with a low concentration of PFOA and/or PFOS flows out of the separation vessel via an outlet line. Flow through the outlet line is controlled by a valve, which is open during the capture cycle ("system in use"). A second outlet line for use during a regeneration cycle is closed.

The system of FIG. 3 can also be described in terms of an integrated capture and regeneration method. During a capture cycle of the integrated method, contaminated water from the raw water tank flows into the two separation vessels (activated carbon EDI filtration column and activated graphite EDI concentrating column). This flow is controlled by a valve and a pump for each separation vessel as shown. Voltage is applied to the capture beds in each separation vessel. The water with contaminant removed by the capture beds is flowed to a clean water tank, which flow is controlled by further valves. Optionally the outlet flow of the separation vessels may be recirculated, as controlled by a recirculation valve, to the raw water tank for additional cycle(s) of purification.

Still referring to FIG. 3, during a regeneration cycle, wash liquid from a waste water tank is flowed through the separation vessels and also controlled using the same valves and pumps as during the capture cycle. The voltage is modulated during the regeneration cycle to drive release of the bound contaminant from the capture bed as the wash liquid flows through the separation vessel. The wash liquid with released contaminant ("extract") is flowed to a precipitator where it is mixed with regeneration fluid that is pumped into the precipitator. The regeneration fluid comprises a sequestration agent (e.g., a counter ion) that forms an aggregate contaminant phase with the released contaminant. The aggregate contaminant phase precipitates from the wash liquid in the precipitator and the solids are collected in a settler and removed. Wash liquid exiting the precipitator/settler is filtered and returned for continued use in washing the capture beds.

VI. Examples

Example 1: Regeneration of Carbon Substrate

An experiment was carried out to test the regeneration of carbon substrate using calcium hydroxide and calcium chloride. The experiment tested the capture, regeneration, and sequestration of (i) octanoic acid and (ii) PFOA on carbon substrate using calcium hydroxide or calcium chloride as sequestration agent. Octanoic acid is a simulant of PFAS, which has similar behavior in water but not the disposal issues of actual PFAS. Visual indications and mass measurements were used to determine the results of the experiment.

Figure 4:
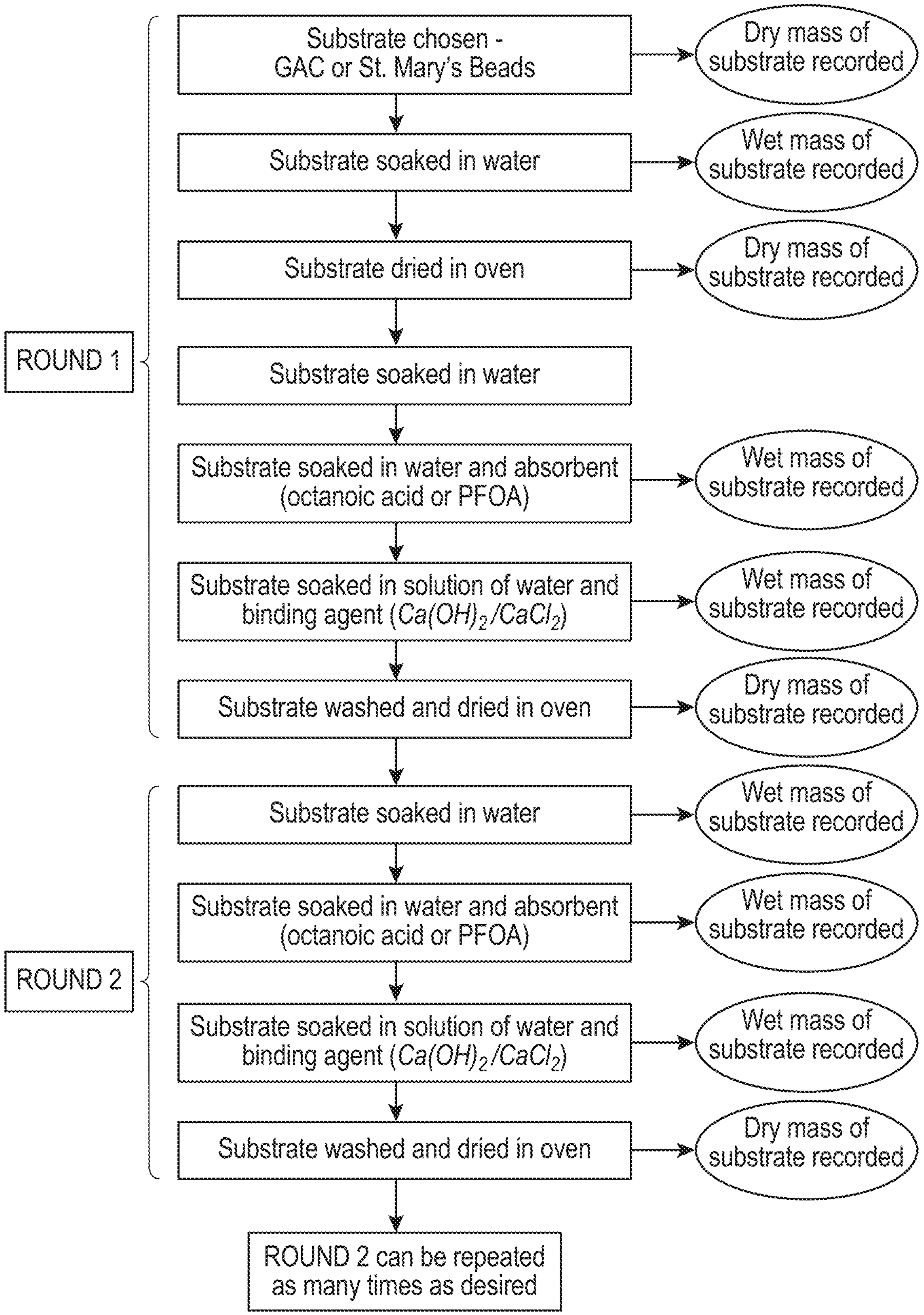
FIG. 4 is a flow chart showing the steps of Example 1.

FIG. 4 shows a flowchart of the testing method. A first carbon substrate was selected, either granulated activated carbon (GAC) or St Mary's carbon beads. The dry mass of the substrate was recorded. The substrate was next soaked in water and the wet mass mas recorded. The substrate was then dried in an oven and the mass after drying recorded. The substrate was next soaked in water followed by soaking overnight in a mixture of water and a specified and recorded mass of contaminant—either octanoic acid (OA) or PFOA. The wet mass of the substrate was then recorded to determine capture of OA/PFOA. The substrate was next soaked overnight in a solution of water and a specified and recorded mass of sequestration agent—either $Ca(OH)_2$ or $CaCl_2$. NaOH was also added in the case of $CaCl_2$. After soaking and washing, the wet mass of the substrate was recorded. The substrate was then dried in oven and the dry mass after drying was recorded. The sequestration agent solution was dried and the mass of precipitate from the solution was recorded.

The same basic procedure can then be repeated for a second and subsequent rounds of capture, regeneration and sequestration with mass measurements. Second and third rounds were completed for the present experiment. The dried substrate from the final step of Round 1 was soaked in water and the wet mass of substrate was recorded. Next, the substrate was soaked overnight in water and a contaminant—either octanoic acid (OA) or PFOA. The wet mass of the substrate was then recorded to determine capture of OA/PFOA. The substrate was next soaked in solution of water and a sequestration agent—either $Ca(OH)_2$ or $CaCl_2$. NaOH was also added in the case of $CaCl_2$. After soaking and washing, the wet mass of the substrate was recorded. The substrate was then dried in oven and the dry mass after drying was recorded. The sequestration agent solution was dried and the mass of precipitate from the solution was recorded.

Figure 5:
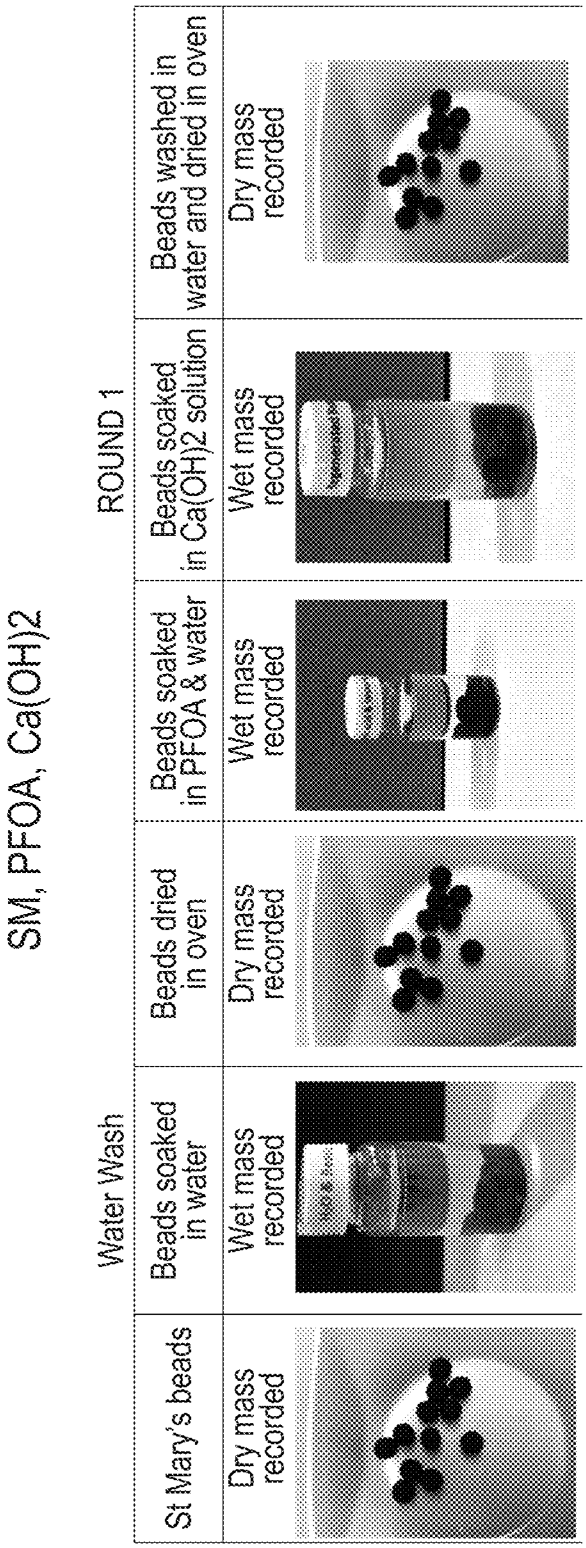
FIG. 5 shows the visual appearance of the carbon substrate of Example 1.
Figure 6:
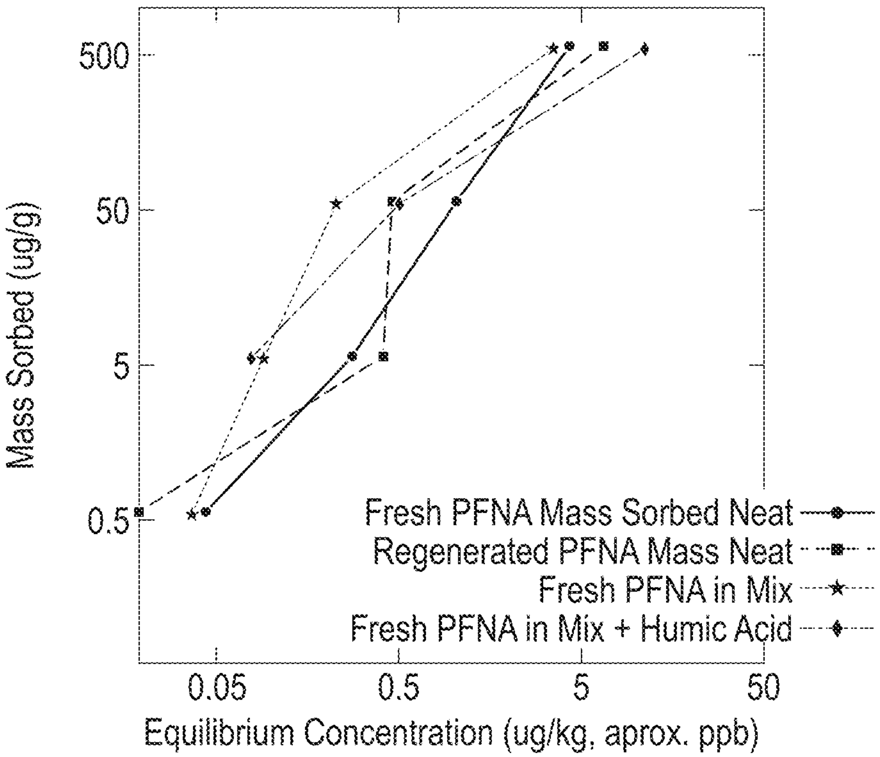
FIG. 6 is a chart showing PFNA absorption by a fresh carbon bed from a mixed contaminant sample.
Figure 7:
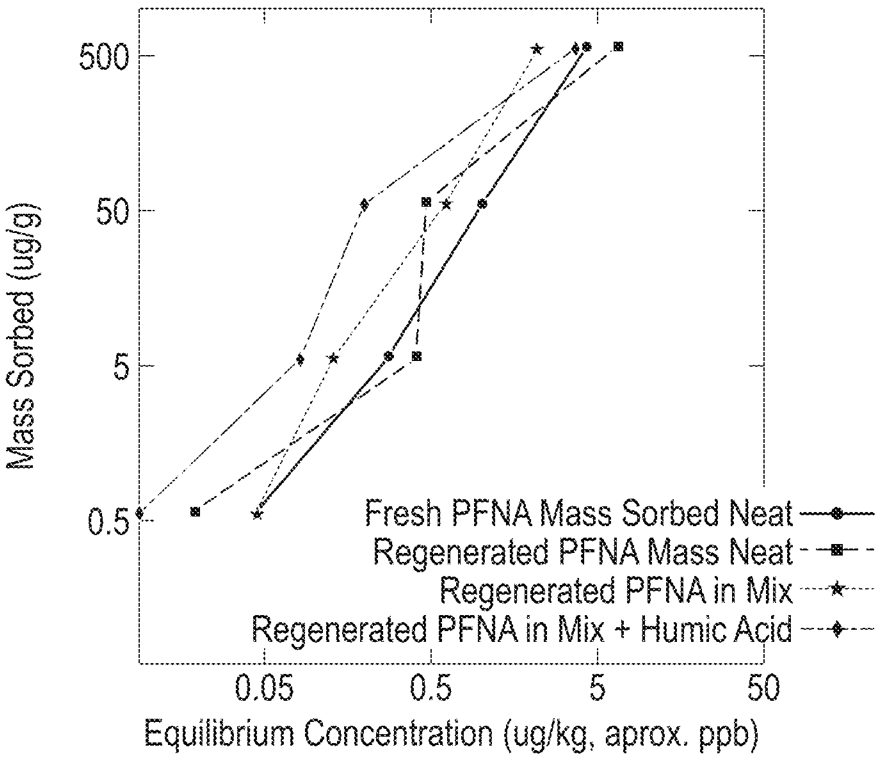
FIG. 7 is a chart showing PFNA absorption by a regenerated carbon bed from a mixed contaminant sample.
Figure 8:
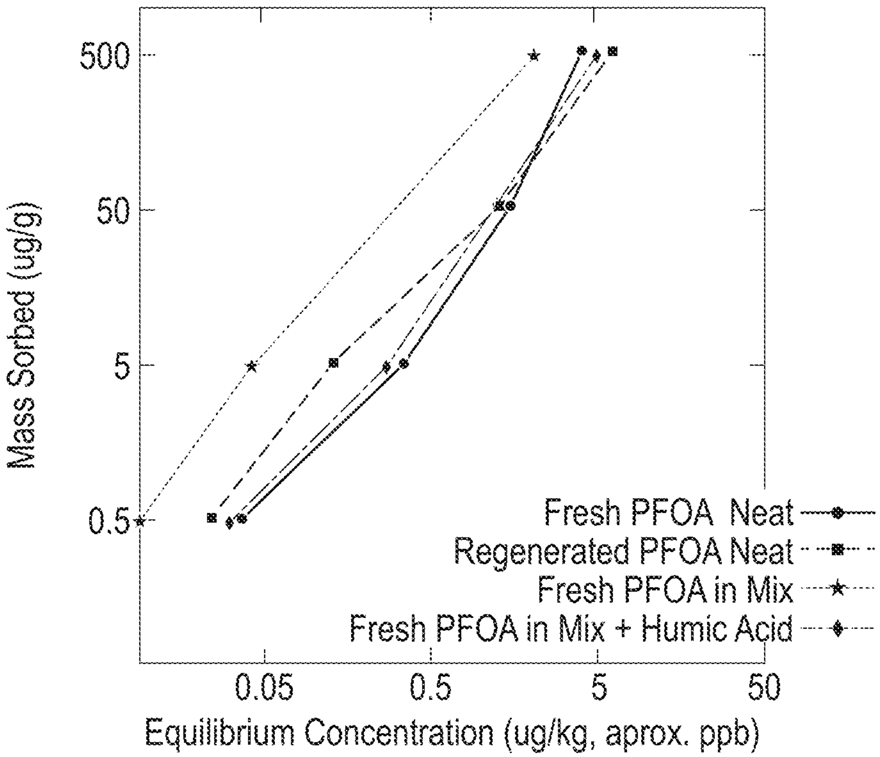
FIG. 8 is a chart showing PFOA absorption by a fresh carbon bed from a mixed contaminant sample.
Figure 9:
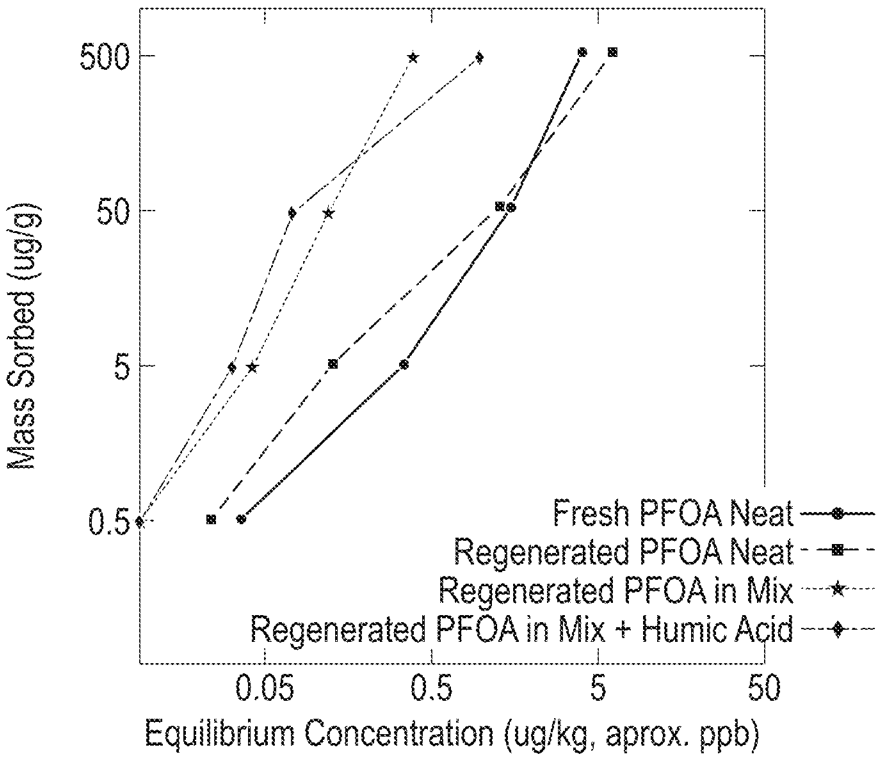
FIG. 9 is a chart showing PFOA absorption by a regenerated carbon bed from a mixed contaminant sample.
Figure 10:
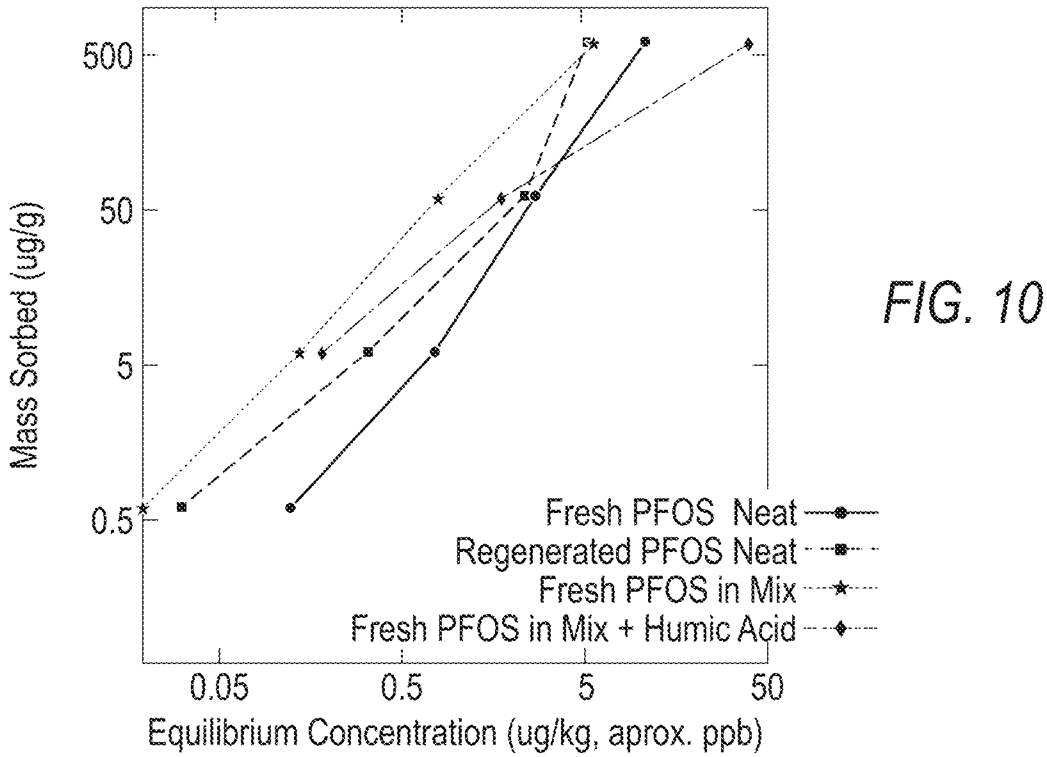
FIG. 10 is a chart showing PFOS absorption by a fresh carbon bed from a mixed contaminant sample.
Figure 11:
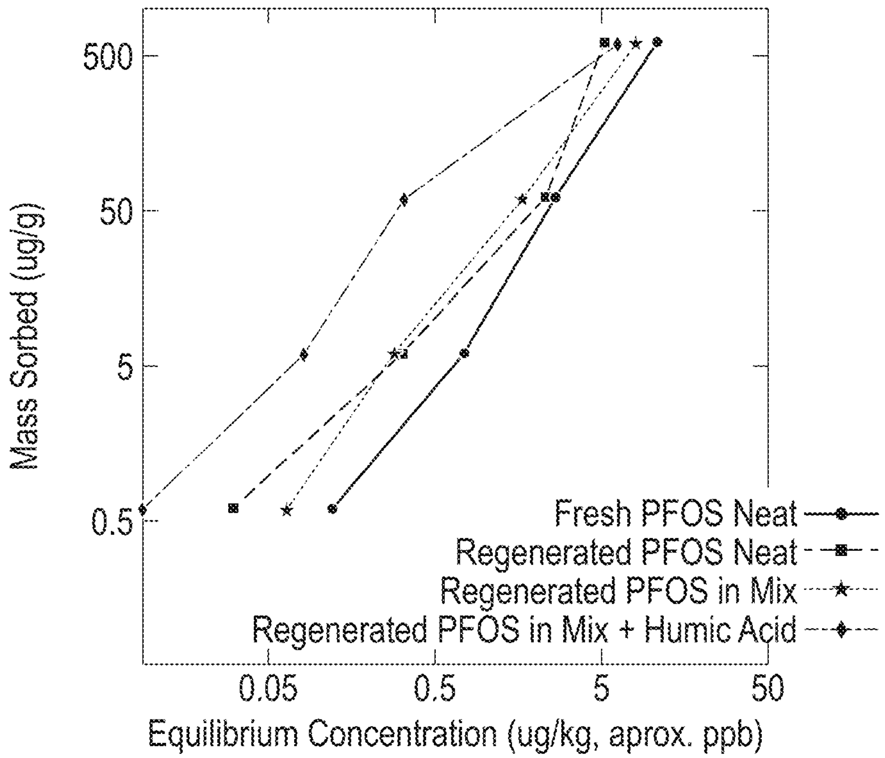
FIG. 11 is a chart showing PFOS absorption by a regenerated carbon bed from a mixed contaminant sample.

Tables 1-4 show the results of the mass measurements for the experiment over the course of the initial wash procedure and three rounds of capture, regeneration and sequestration. Table 5 shows the recovered mass of precipitate recovered for each round. FIG. 5 shows visual observation of St. Mary's Beads (activated carbon beads) over the course of the first round of testing.

The results demonstrated that the carbon substrates were able to releasably capture OA and PFOA, and that the sequestration agent (calcium hydroxide or calcium chloride) was able to bind the OA or PFOA, be released from the carbon substrate, and be sequestered as a precipitate. The process was repeatable, showing the ability to capture OA and PFOA on the carbon substrate and subsequently regenerate the carbon substrate for multiple uses.

TABLE 1

Water Wash.

| Vial Group | Fresh Beads Dry Mass (g) | Wet with water mass (g) | Post Water Dry mass (g) | Water wash delta mass (g) |
|---|---|---|---|---|
| SM, PFOA, $Ca(OH)_2$ | 2.5545 | 3.3140 | Not taken | NA |
| SM, OA, $Ca(OH)_2$ | 2.5425 | 3.3125 | 2.5459 | 0.0034 |
| SM, PFOA, $CaCl_2$ | 2.5320 | 3.3114 | 2.5340 | 0.0020 |
| GAC, PFOA, $Ca(OH)_2$ | 0.5209 | 1.2054 | 0.4976 | −0.0233 |
| GAC, PFOA, $CaCl_2$ | 0.5295 | 1.4055 | 0.5026 | −0.0269 |
| GAC, OA, $CaCl_2$ | 0.5220 | 1.3529 | 0.4930 | −0.0290 |

TABLE 2

First Round of Capture/Release

| Vial Group | Mass of contaminant (OA/PFOA) (g) | Wet mass of beads after OA/PFOA (g) | Mass of sequestrant Ca(OH)2/CaCl2 (g) | Wet mass after regen 1 (g) | Dry mass after regen 1 (g) | First regen dry delta mass (g) | Bead/GAC mass regeneration (%) |
|---|---|---|---|---|---|---|---|
| SM, PFOA, $Ca(OH)_2$ | 0.0963 | 3.3308 | 0.0075 | 3.3345 | 2.5641 | 0.0096 | 99.6242 |
| SM, OA, $Ca(OH)_2$ | 0.1203 | 3.3151 | 0.0344 | 3.3209 | 2.5470 | 0.0011 | 99.9568 |
| SM, PFOA, $CaCl_2$ | 0.0581 | 3.3319 | 0.0089 | 3.3315 | 2.5419 | 0.0079 | 99.6882 |
| GAC, PFOA, $Ca(OH)_2$ | 0.0582 | 1.2376 | 0.0085 | 1.2052 | 0.5272 | 0.0296 | 94.0514 |
| GAC, PFOA, $CaCl_2$ | 0.0528 | 1.4704 | 0.0120 | 1.4067 | 0.5391 | 0.0365 | 92.7378 |
| GAC, OA, $CaCl_2$ | 0.1258 | 1.3942 | 0.0603 | 1.3618 | 0.5756 | 0.0826 | 83.2454 |

TABLE 3

| Second Round of Capture/Release | | | | | | | | |
|---|---|---|---|---|---|---|---|---|
| Vial Group | Wet mass after soaking in water (g) | Mass of contaminant (OA/PFOA) (g) | Wet mass of beads after OA/PFOA (g) | Mass of sequestrant (Ca(OH)2/CaCl2) (g) | Wet mass after regen 2 (g) | Dry mass after regen 2 (g) | Second regen dry delta mass (g) | Bead/GAC mass regeneration (%) |
| SM, PFOA, $Ca(OH)_2$ | 3.3306 | 0.0596 | 3.3390 | 0.0079 | 3.3360 | 2.5548 | 0.0003 | 99.9883 |
| SM, OA, $Ca(OH)_2$ | 3.2067 | 0.1204 | 3.3017 | 0.0388 | 3.3209 | 2.5571 | 0.0112 | 99.5601 |
| SM, PFOA, $CaCl_2$ | 3.3194 | 0.0501 | 3.3291 | 0.0231 | 3.3289 | 2.5350 | 0.0010 | 99.9605 |
| GAC, PFOA, $Ca(OH)_2$ | 1.1961 | 0.0510 | 1.2529 | 0.0133 | 1.2077 | 0.5281 | 0.0305 | 93.8706 |
| GAC, PFOA, $CaCl_2$ | 1.3947 | 0.0514 | 1.4315 | 0.0360 | 1.3988 | 0.5650 | 0.0624 | 87.5846 |
| GAC, OA, $CaCl_2$ | 1.3270 | 0.1202 | 1.3587 | 0.0726 | 1.3762 | 0.5529 | 0.0599 | 87.8499 |

TABLE 4

| Third Round of Capture/Release | | | | | | | | |
|---|---|---|---|---|---|---|---|---|
| Vial Group | Wet mass after soaking in water (g) | Mass of contaminant (OA/PFOA) (g) | Wet mass of beads after OA/PFOA (g) | Mass of sequestrant (Ca(OH)2/CaCl2) (g) | Wet mass after regen 3 (g) | Dry mass after regen 3 (g) | Third regen dry delta mass (g) | Bead/GAC mass regeneration (%) |
| SM, PFOA, $Ca(OH)_2$ | 3.3190 | 0.0543 | 3.3317 | 0.0102 | 3.3303 | 2.5559 | 0.0014 | 99.9452 |
| SM, OA, $Ca(OH)_2$ | 3.2392 | 0.1116 | 3.3133 | 0.0403 | 3.3130 | 2.5459 | 0.0034 | 99.8665 |
| SM, PFOA, $CaCl_2$ | 3.3181 | 0.0531 | 3.3310 | 0.0286 | 3.3310 | 2.5376 | 0.0056 | 99.7790 |
| GAC, PFOA, $Ca(OH)_2$ | 1.1806 | 0.0511 | 1.2250 | 0.0151 | 1.2189 | 0.5461 | 0.0252 | 94.9357 |
| GAC, PFOA, $CaCl_2$ | 1.4195 | 0.0522 | 1.4574 | 0.0391 | 1.4366 | 0.5961 | 0.0666 | 86.7489 |
| GAC, OA, $CaCl_2$ | 1.2767 | 0.1272 | 1.3020 | 0.0811 | 1.2835 | 0.5781 | 0.0561 | 88.6207 |

TABLE 5

| Recovered Mass of Precipitate | | | | | | | | | | |
|---|---|---|---|---|---|---|---|---|---|---|
| | | ROUND 1 | | | ROUND 2 | | | ROUND 3 | | |
| Vial Group | Regeneration Precipitate | Expected mass of precipitate (g) | Actual mass of precipitate (g) | Recovered Yield (%) | Expected mass of precipitate (g) | Actual mass of precipitate (g) | Recovered Yield (%) | Expected mass of precipitate (g) | Actual mass of precipitate (g) | Recovered Yield (%) |
| SM, PFOA, $Ca(OH)_2$ | Calcium perfluoro-octanoate | 0.088 | 0.073 | 83.66 | 0.064 | 0.053 | 83.49 | 0.057 | 0.050 | 87.50 |
| SM, OA, $Ca(OH)_2$ | Calcium octanoate | 0.136 | 0.106 | 77.94 | 0.136 | 0.130 | 95.60 | 0.126 | 0.122 | 96.28 |
| SM, PFOA, $CaCl_2$ | Calcium perfluoro-octanoate | 0.061 | 0.019 | 30.43 | 0.054 | 0.028 | 53.08 | 0.056 | 0.050 | 88.29 |
| GAC, PFOA, $Ca(OH)_2$ | Calcium perfluoro-octanoate | 0.061 | 0.052 | 86.04 | 0.055 | 0.035 | 63.67 | 0.053 | 0.038 | 70.22 |
| GAC, PFOA, $CaCl_2$ | Calcium perfluoro-octanoate | 0.055 | 0.039 | 71.38 | 0.055 | 0.038 | 68.31 | 0.055 | 0.048 | 87.36 |
| GAC, OA, $CaCl_2$ | Calcium octanoate | 0.142 | 0.072 | 50.21 | 0.136 | 0.128 | 93.83 | 0.140 | 0.106 | 73.89 |

Example 2: Carbon Bed Regeneration with Acid Wash

To assess regeneration capability, the sorption isotherm of fresh activated carbon (Calgon F400) was compared to the sorption isotherm of regenerated activated carbon for a model PFAS compound, perfluoroctanoic acid (PFOA).

Procedure:

After rinsing, each flask was dosed again with 225834.6572 µg/kg PFOA solution. 102.70 g of DI water, +/−1 g, was weighed into each of the 20 250 ml Erlenmeyer flasks according to Table 6. 22.1 mL of PFOA stock was added, 1277345.346 µg/kg. Flasks were tipped slowly to ensure all activated carbon was submerged in water and not stuck to the side, and placed on the shaker at 150 rpm for 18 hours.

TABLE 6

Raw data for each of the 20 flasks tested. All prewash adsorbances were measured on the 13 ml method.

| Flask | PFOA concentration (µg/kg) | Activated Carbon Mass (g) | Regen Washes | Water Washes | Acid Washes | Pre Wash Absorbance | Post Wash Absorbance | pH post Wash | UV Method Post Wash |
|---|---|---|---|---|---|---|---|---|---|
| 1 | 225834 | 0.7503 | 2 | 3 | 0 | 0.53 | 1.338 | 6.49 | 1.5 mL |
| 2 | 225834 | 0.7501 | 2 | 3 | 0 | 0.577 | 1.47 | 6.75 | Method |
| 3 | 225834 | 0.7506 | 2 | 3 | 1 | 0.502 | 0.93 | 4.15 | 13 mL |
| 4 | 225834 | 0.7501 | 2 | 3 | 1 | 0.374 | 0.688 | 4.18 | method |
| 5 | 225834 | 0.75 | 2 | 2 | 0 | 0.881 | 1.693 | 7.34 | 1.5 mL |
| 6 | 225834 | 0.7507 | 2 | 2 | 0 | 0.471 | 1.317 | 7.29 | Method |
| 7 | 225834 | 0.7507 | 2 | 2 | 0 | 0.743 | 1.493 | 7.07 | |
| 8 | 225834 | 0.7508 | 2 | 2 | 1 | 0.593 | 0.794 | 4.02 | 13 mL |
| 9 | 225834 | 0.7504 | 2 | 2 | 1 | 0.765 | 0.888 | 4.05 | Method |
| 10 | 225834 | 0.7503 | 2 | 2 | 1 | 0.708 | 0.909 | 4.05 | |
| 11 | 225834 | 0.7501 | 1 | 3 | 0 | 0.663 | 1.448 | 6.82 | 1.5 mL |
| 12 | 225834 | 0.7505 | 1 | 3 | 0 | 0.619 | 1.407 | 6.64 | Method |
| 13 | 225834 | 0.7506 | 1 | 3 | 0 | 0.459 | 1.331 | 6.58 | |
| 14 | 225834 | 0.7503 | 1 | 3 | 1 | 0.636 | 0.912 | 4.12 | 13 mL |
| 15 | 225834 | 0.7503 | 1 | 3 | 1 | 0.473 | 0.949 | 4.1 | Method |
| 16 | 225834 | 0.7504 | 1 | 3 | 1 | 0.706 | 0.927 | 4.11 | |
| 17 | 225834 | 0.7501 | 1 | 2 | 0 | 0.732 | 1.516 | 7.24 | 1.5 mL |
| 18 | 225834 | 0.7507 | 1 | 2 | 0 | 0.4 | 1.215 | 7.25 | Method |
| 19 | 225834 | 0.7507 | 1 | 2 | 1 | 0.696 | 0.72 | 3.99 | 13 mL |
| 20 | 225834 | 0.7506 | 1 | 2 | 1 | 1.147 | 1.052 | 3.93 | Method |

Calgon F400 activated carbon was rinsed with DI water and dried at 100° C. in a vacuum oven. 0.1 g+/−0.001 PFOA was weighed and placed into a 2 L clean glass bottle. 2 L of deionized water was added to bottle, via volumetric flask. Actual input weights and volumes were recorded. PFOA was stirred until completely dissolved.

102.70 g of DI water, +/−1 g, was weighed into each of 20 250 ml Erlenmeyer flasks according to Table 6. With a micropipette 22.1 mL of PFOA stock was added, 1277345 µg/kg. Calgon F400 activated carbon was measured using a calibrated balance and placed 0.75, +/−0.001 g, each in 20 glass 250 ml Erlenmeyer flasks and shaken.

2 oz. glass sample vials were prepared by rinsing with DI water and removing foam seal from cap. After 18 hours on the shaker, with a pipette (rinsed with DI water), a 2 oz. sample was removed from each condition, switching tips between samples, being careful not to remove activated carbon, and vials were rinsed with sample prior to filling. The remaining PFOA solution was removed from each flask and placed in waste.

A solution of 1 g/L $Ca(OH)_2$ (regeneration fluid) was prepared, and mixed on a stir plate until all $Ca(OH)_2$ was dissolved. 1% acetic acid wash was prepared by diluting 5% vinegar. 125 ml of $Ca(OH)_2$ stock solution was measured into each flask and shaken at 150 rpm for 1 hour. Regeneration solution was removed by pouring off liquid. Rinses were continued according to Table 6. Any following regeneration fluid rinse was shaken at 150 rpm for an hour, following acid or water rinses occurred for 30 minutes at 150 rpm. Any acid rinses were completed after the regeneration wash(es) and prior to the water washes. The solutions were poured off before the next rinse.

All samples were run with the UV-Visible Spectrometry method to measure equilibrium PFOA concentrations post regeneration. The pH was checked when samples were taken.

UV-Visible Spectrometry Procedure

Two calibration standards were made at 10 and 11 points each using a micropipette, DI water, and PFOA batch solution. The 10 point curve was used for post-regeneration non-acid rinsed samples, and used 1.5 mL of standard as follows: 0, 600.36, 1000.59, 2000.33, 4257.84, 10644.60, 14902.44, 19160.28, 25547.03, and 38320.55 µg/kg. The 11 point curve was used for fresh carbon and post-regeneration acid rinsed samples, and used 13 mL of the following standards: 0, 50.24, 100.48, 200.12, 400.24, 800.47, 1000.59, 1500.46, 2000.33, 2554.70, and 2980.49 µg/kg. Standards were filtered into DI rinsed vials using 0.22 µm PVDF/GF syringe filters. All calibration samples were prepared with their appropriate quantity of standard mixed with 2.5 mL 1-octanol, and 1 mL methylene blue solution. Calibration samples were ran on UV-Visible method, to generate calibration curves.

0.22 µm 13 mm PVDF/GF syringe filter was used to filter each of the samples into new (DI water rinsed) vials, changing syringes and filters between samples. Samples were filtered because residual activated carbon will affect absorbance readings. All samples were run on UV-Visible Spectrometry methods to measure equilibrium PFOA concentrations for fresh activated carbon.

The UV Spectrophotometer was set to 664 nm. The organic and aqueous phases were separated cleanly in a test tube, and organic phase was removed, and placed into a cuvette. The cuvette was placed, with water-saturated octanol, in the UV Spectrophotometer to zero the machine, then the cuvette with sample was placed and ran to measure UV absorbance.

pH probe was removed from storage solution, rinsed with deionized water, and gently wiped with Kimwipe. 4.01, 7.01, and 10.01 solutions were placed in vials. Probe was calibrated to 7.01, then to 4.01 and 10.01, then pH was checked for the 7.01 calibration again. After calibration, each flask was tested directly (with carbon in the flask), swirling the flask while testing and rinsing the probe between standards.

Results:

Table 7 shows equilibrium concentrations and percent recovery of sorptive capacity for each sample. Percent recovery was calculated by dividing the mass sorbed for fresh carbon by the mass sorbed for regenerated carbon and multiplying by 100.

TABLE 7

| Sample Number | Activated Carbon Mass (g) | Regen Washes | Water Washes | Acid Washes | Fresh Carbon Equilibrium Concentration (μg/kg) | Regenerated Carbon Equilibrium Concentration (μg/kg) | Fresh Carbon Mass Sorbed (μg/g) | Regenerated Carbon Mass Sorbed (μg/g) | Percent Recovery of Capacity |
|---|---|---|---|---|---|---|---|---|---|
| 1 | 0.7503 | 2 | 3 | 0 | 313 | 91134 | 37496 | 22396 | 59.73% |
| 2 | 0.7501 | 2 | 3 | 0 | 354 | 104204 | 37499 | 20228 | 53.94% |
| 3 | 0.7506 | 2 | 3 | 1 | 289 | 741 | 37485 | 37410 | 99.80% |
| 4 | 0.7501 | 2 | 3 | 1 | 192 | 462 | 37526 | 37481 | 99.88% |
| 5 | 0.7500 | 2 | 2 | 0 | 680 | 129296 | 37450 | 16057 | 42.88% |
| 6 | 0.7507 | 2 | 2 | 0 | 264 | 89169 | 37484 | 22710 | 60.59% |
| 7 | 0.7507 | 2 | 2 | 0 | 520 | 106613 | 37442 | 19812 | 52.91% |
| 8 | 0.7508 | 2 | 2 | 1 | 369 | 576 | 37462 | 37427 | 99.91% |
| 9 | 0.7504 | 2 | 2 | 1 | 544 | 688 | 37453 | 37429 | 99.94% |
| 10 | 0.7503 | 2 | 2 | 1 | 482 | 715 | 37468 | 37429 | 99.90% |
| 11 | 0.7501 | 1 | 3 | 0 | 436 | 101938 | 37486 | 20605 | 54.97% |
| 12 | 0.7505 | 1 | 3 | 0 | 393 | 97809 | 37473 | 21280 | 56.79% |
| 13 | 0.7506 | 1 | 3 | 0 | 255 | 90475 | 37491 | 22496 | 60.00% |
| 14 | 0.7503 | 1 | 3 | 1 | 410 | 718 | 37480 | 37429 | 99.86% |
| 15 | 0.7503 | 1 | 3 | 1 | 266 | 766 | 37504 | 37421 | 99.78% |
| 16 | 0.7504 | 1 | 3 | 1 | 480 | 737 | 37463 | 37421 | 99.89% |
| 17 | 0.7501 | 1 | 2 | 0 | 508 | 109061 | 37474 | 19420 | 51.82% |
| 18 | 0.7507 | 1 | 2 | 0 | 210 | 80049 | 37493 | 24226 | 64.61% |
| 19 | 0.7507 | 1 | 2 | 1 | 470 | 495 | 37450 | 37446 | 99.99% |
| 20 | 0.7506 | 1 | 2 | 1 | 1045 | 906 | 37360 | 37383 | 100.06% |

Table 8 is a summary table showing the average percent recovery of sorptive capacity for the high number and low number of rinses for each process step. The difference between the percent recovery for the high and low number of rinses for each demonstrates the level of importance of each washing step (regeneration fluid, wash water, acetic acid rinse) on the percent recovery.

TABLE 8

| | Average Percent Recovery for all Low Number of Regen Rinses | Average Percent Recovery for all High Number of Regen Rinses | Average Percent Recovery for all Low Number of Water Rinses | Average Percent Recovery for all High Number of Water Rinses | Average Percent Recovery for all Low Number of Acid Rinses | Average Percent Recovery for all High Number of Acid Rinses |
|---|---|---|---|---|---|---|
| Average Percent Recovery for each rinse condition | 78.78% | 76.95% | 77.26% | 78.46% | 55.82% | 99.90% |
| Difference in Average Percent Recovery from High Number of Rinses to Low Number of Rinses | −1.83% | | 1.20% | | 44.08% | |

Table 9 shows the average mass sorbed and percent standard deviation for all duplicates in each condition.

TABLE 9

| Condition | Regen Washes | Water Washes | Acid Washes | Average Mass Sorbed (μg/g) | Percent Standard Deviation in Mass Sorbed | Percent Recovery of Capacity | Number of Samples in Subset |
|---|---|---|---|---|---|---|---|
| Fresh | — | — | — | 37472 | 0.0903% | — | 20 |
| Regenerated | 2 | 3 | 0 | 21312 | 0.0001% | 56.84% | 2 |
| Regenerated | 2 | 3 | 1 | 37446 | 0.1348% | 99.84% | 2 |
| Regenerated | 2 | 2 | 0 | 19526 | 17.0833% | 52.13% | 3 |
| Regenerated | 2 | 2 | 1 | 37429 | 0.0027% | 99.91% | 3 |
| Regenerated | 1 | 3 | 0 | 21460 | 4.4660% | 57.25% | 3 |
| Regenerated | 1 | 3 | 1 | 37423 | 0.0123% | 99.84% | 3 |
| Regenerated | 1 | 2 | 0 | 21823 | 15.5709% | 58.22% | 2 |
| Regenerated | 1 | 2 | 1 | 37414 | 0.1196% | 100.03% | 2 |

Table 10 is a summary table showing the average pH for the high number and low number of rinses for each process step. The difference between the pH for the high and low number of rinses for each demonstrates the level of importance of each washing step (regeneration fluid, wash water, acetic acid rinse) in changing the pH of the process.

TABLE 10

| | Average pH for all Low Number of Regen Rinses | Average pH for all High Number of Regen Rinses | Average pH for all Low Number of Water Rinses | Average pH for all High Number of Water Rinses | Average pH for all Low Number of Acid Rinses | Average pH for all High Number of Acid Rinses |
|---|---|---|---|---|---|---|
| Average pH for each rinse condition | 5.478 | 5.539 | 5.623 | 5.394 | 6.947 | 4.07 |
| Difference in Average pH from High Number of Rinses to Low Number of Rinses | 0.061 | | −0.229 | | −2.877 | |

Conclusions:

The study demonstrated successful regeneration of the carbon to capture PFOA. Percent recovery along all conditions ranged from 42.88% to 100.06%. The average percent recovery for samples seemed to be the most affected by acid washing. Increasing the number of regeneration rinses from 1 to 2 decreased the average percent recovery by 1.83%, while increasing the water washes from 2 to 3 increased percent recovery by 1.20% (Table 8). Increasing the number of acid washes from 0 to 1, however, increased percent recovery by 44.08%, bringing the average percent recovery for all acid washed samples to 99.90% (Table 8). This indicates that a decrease in both the number of regeneration washes and the number of water washes has little effect on the process.

The pH was also most greatly affected by the acid washing step, dropping by 2.877 on average for acid washed samples (Table 10). Increasing water rinses also decreased the pH (Table 10), likely due to rinsing off excess regeneration fluid. Increasing the regeneration rinses slightly increased the pH on average, likely because regeneration fluid is basic.

Low percent standard deviation for fresh samples demonstrated high repeatability for fresh carbon (Table 9). For regenerated samples, percent standard deviation remained below 1% for all samples except for 3 samples: 2 Regen Washes/2 Water Washes/0 Acid Washes, 1 Regen Wash/3 Water Washes/0 Acid Washes, and 1 Regen Wash/2 Water Washes/0 Acid Washes.

Example 3: Regeneration of Samples with Mixed Contaminant

Experiments were performed to evaluate the performance of a regeneration system for capturing contaminants from complex samples more closely resembling groundwater. Complex samples were modeled using a mixture of PFOA, PFNA, and PFOS, with and without humic acid.

Calgon F400 activated carbon was rinsed with DI water and dried. PFOA, K-PFOS, and PFNA stock solutions were prepared. A humic acid solution was also prepared. Fresh carbon samples were prepared and tested as shown in Table 11. Regenerated samples were also prepared and tested. For the regenerated samples, carbon samples were exposed to contaminant solutions as shown in Table 11 and allowed to reach equilibrium, then samples were regenerated with $Ca(OH)_2$ solution, regeneration solution was poured off, carbon bed samples were rinsed again with regeneration solution, and then finally carbon samples were treated a second time with same contaminant solutions as shown in Table 11. Absorption of contaminant was tested in fresh and regenerated carbon bed samples with and without humic acid as shown in Table 11.

TABLE 11

Experimental setup for testing

| Volume 38451.0 g/kg PFOA stock added (ml) | Volume 43131.6 g/kg PFNA stock added (ml) | Volume 46461.5 g/kg PFOS stock added (ml) | Calgon F400 Mass (g) | Regeneration Condition | Humic Acid Concentration (mg/l) |
|---|---|---|---|---|---|
| 0 | 0 | 0 | 0.7502 | Fresh and Loaded | 0 |
| 0.01 | 0.01 | 0.01 | 0.7508 | Fresh and Loaded | 0 |
| 0.1 | 0.1 | 0.1 | 0.7501 | Fresh and Loaded | 0 |
| 1 | 1 | 1 | 0.7504 | Fresh and Loaded | 0 |
| 10 | 10 | 10 | 0.7502 | Fresh and Loaded | 0 |
| 0 | 0 | 0 | 0.7502 | Regenerated Reloaded | 0 |
| 0.01 | 0.01 | 0.01 | 0.7506 | Regenerated Reloaded | 0 |
| 0.1 | 0.1 | 0.1 | 0.7508 | Regenerated Reloaded | 0 |
| 1 | 1 | 1 | 0.7501 | Regenerated Reloaded | 0 |
| 10 | 10 | 10 | 0.7502 | Regenerated Reloaded | 0 |
| 0 | 0 | 0 | 0.7506 | Fresh and Loaded | 0 |
| 0.01 | 0.01 | 0.01 | 0.7508 | Fresh and Loaded | 10 |
| 0.1 | 0.1 | 0.1 | 0.7503 | Fresh and Loaded | 10 |
| 1 | 1 | 1 | 0.7504 | Fresh and Loaded | 10 |
| 10 | 10 | 10 | 0.7302 | Fresh and Loaded | 10 |
| 0 | 0 | 0 | 0.7507 | Regenerated Reloaded | 10 |
| 0.01 | 0.01 | 0.01 | 0.7506 | Regenerated Reloaded | 10 |
| 0.1 | 0.1 | 0.1 | 0.7503 | Regenerated Reloaded | 10 |
| 1 | 1 | 1 | 0.7508 | Regenerated Reloaded | 10 |
| 10 | 10 | 10 | 0.75 | Regenerated Reloaded | 10 |
| 0 | 0 | 0 | 0 | N/A | 10 |
| 10 | 10 | 10 | 0 | N/A | 0 |

Results of absorption testing are shown in FIGS. 6-11. The carbon bed effectively captured PFOA, PFNA, and PFOS from the mixed contaminant solution both for fresh carbon samples and regenerated carbon samples. Capture was effective both in the presence and absence of humic acid. Thus, the regenerated system was effective for capturing mixed contaminants.

Example 4: Column Testing

In view of the successful regeneration in Examples 1-3, column testing was performed to investigate a model column system with flow of contaminated solution and regeneration solution through the column.

A small column (10 cm tall×1.5 cm diameter) was loaded with freshly rinsed and dried GAC (14-15 g Calgon F400) as a capture bed. The capture bed was rinsed with DI water and then dosed with a 100 ppm PFOA solution. The filtrate was sampled every 3000 s until 31 samples were collected for producing a first curve of PFOA concentration in the filtrate. The dosing solution was pumped at a rate where the contact time was approximately 160 s and the column filtered 12-14 L until sampling was complete. Regeneration fluids were pumped through the column in order, with volumes chosen to be 50× or more of the free volume of the column. The first regeneration solution was a detergent solution of octanoic acid (0.2 g in 1 L DI water). The second regeneration solution was an aluminum hydroxide solution (320 g NaOH and 480 g $Al(OH)_3$ in 16 L DI water). The third regeneration solution was a calcium hydroxide solution (4 g $Ca(OH)_2$ in 2 L DI water). The fourth regeneration solution was a sodium hydroxide solution (4 g NaOH in 1 L DI water). Finally, the fifth regeneration solution was an acid wash solution (250 mL 12.39M HCl solution in 15.75 L DI water). Regeneration DI water was then pumped through the column until filtrate was pH>5. To produce the second curve for regenerated capture bed, the same procedure was followed for dosing with 100 ppm PFOA solution.

Figure 12:
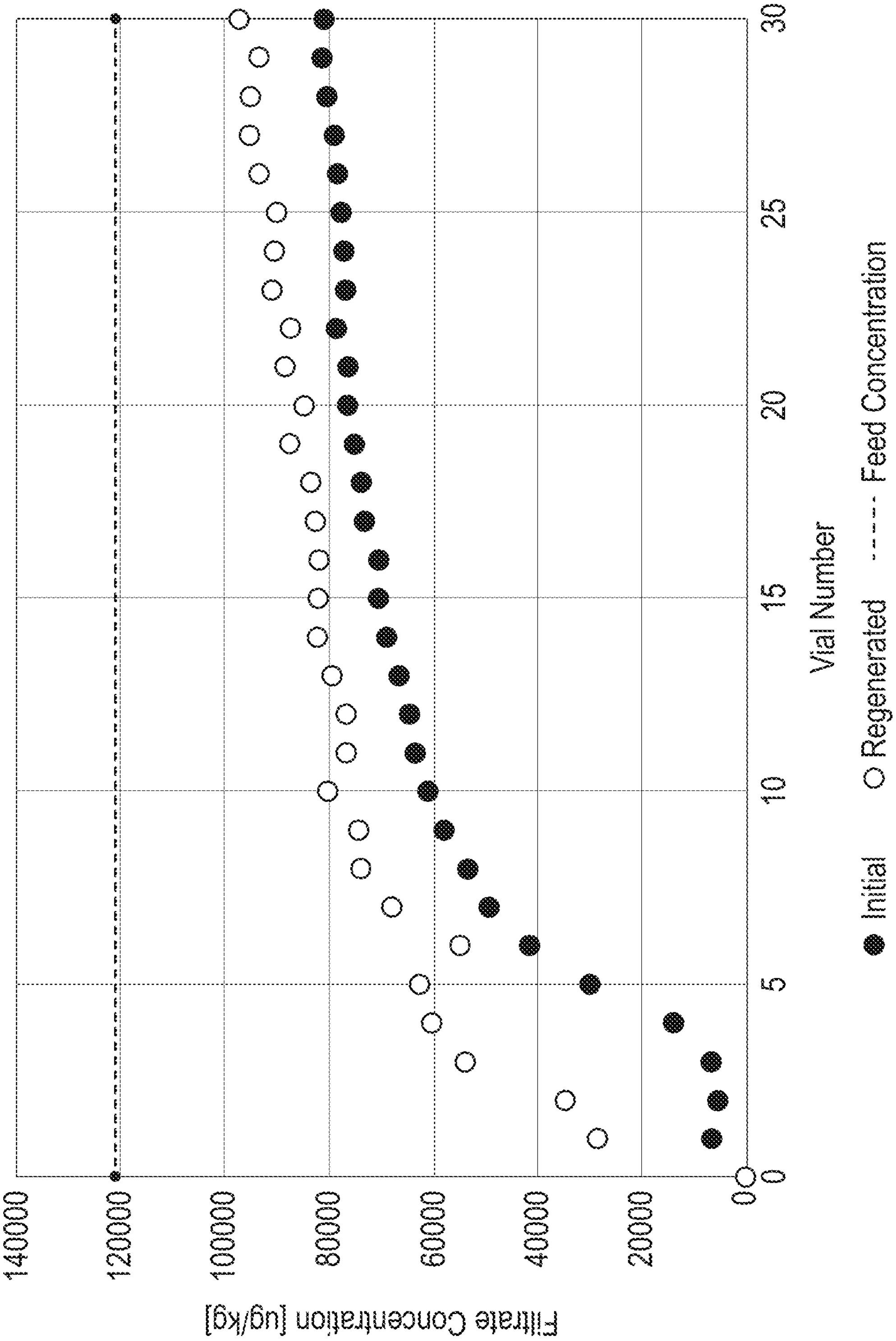
FIG. 12 is a chart showing the concentration of PFOA in filtrate collected after flow through a carbon bed in a column.

FIG. 12 shows the initial and regenerated breakthrough curves for the column filtering the 100 ppm PFOA feed solution. The feed concentration is shown as the dashed line. Early sample vials had low PFOA concentration, showing capture of PFOA on the carbon bed, although some PFOA is able to pass through the column even for early vials. The regeneration curve shows that the regenerated bed captured PFOA and closely followed the performance of the fresh bed with a slight decrease in capture rate.

A second separate experiment did not show the same regeneration effectiveness. It is hypothesized that the second experiment did not provide enough regeneration fluid to regenerate the column.

Thus, it is shown that the regeneration process can be effectively used in a column setup with flow of contaminated liquid through the column.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of removing a contaminant from an aqueous mixture comprising:

flowing a contaminated aqueous mixture comprising one or more ionic contaminants through a vessel that houses a capture bed, such that the one or more ionic contaminants is bound to the capture bed, wherein the one or more ionic contaminants are per- and polyfluoroalkyl substances (PFAS), and flowing an aqueous wash liquid through the vessel, wherein the aqueous wash liquid comprises a counter ion that binds to the ionic contaminant forming an aggregate contaminant phase, and wherein the counter ion is a cation selected from $Ca^{2+}$, $Mg^{2+}$, $Zn^{2+}$, $Sr^{2+}$, $Al^{3+}$, $B^{3+}$, or $Fe^{3+}$; or an anion selected from a phosphate, a sulfate, or a borate.

2. The method of claim 1, further comprising applying a voltage to an electrode that is in electrical contact with the capture bed, such that the one or more ionic contaminants is bound to the capture bed, and modulating the voltage applied to the electrode, such that the one or more ionic contaminants bound to the capture bed is released from the capture bed and is washed from the capture bed via the aqueous wash liquid.

3. The method of claim 1, wherein the method further comprises removing the aggregate contaminant phase from the aqueous wash liquid.

4. The method of claim 3, wherein the aggregate contaminant phase separates from the aqueous wash liquid by precipitation.

5. The method of claim 1, further comprising contacting the released ionic contaminant in the aqueous wash liquid with a stationary ion source, such that the ionic contaminant is bound to the stationary ion source and is thereby removed from the aqueous wash liquid.

6. The method of claim 1, further comprising binding an ionic complexing species to the capture bed prior to flowing the contaminated aqueous mixture through the vessel, such that upon flowing the contaminated aqueous mixture through the vessel, the ionic contaminant binds to the capture bed by forming a complex with the ionic complexing species wherein the complex is bound to the capture bed.

7. The method of claim 6, wherein the ionic complexing species is $Ca^{2+}$, $Mg^{2+}$, $Al^{3+}$, phosphate, or borate.

8. The method of claim 1, wherein the capture bed is situated in the vessel such that the contaminated aqueous mixture flows by or through the capture bed.

9. The method of claim 1, wherein the capture bed is adjacent to a separator, wrapped in a separator, enclosed within a separator, or sandwiched between two separators.

10. The method of claim 1, wherein the vessel comprises a capture bed stack comprising a plurality of capture beds, and wherein the plurality of capture beds are separated from each other by one or more separators.

11. The method of claim 1, wherein the ionic contaminant is selected from the group consisting of a polyfluoroalkyl ion, a shortchain PFAS, and any combination thereof.

12. The method of claim 11, wherein the ionic contaminant is a polyfluoroalkyl ion.

13. The method of claim 12, wherein the polyfluoroalkyl ion is perfluorooctanesulfonate or perfluorooctanoate.

14. The method of claim 1, wherein the capture bed is an activated carbon bed.

15. The method of claim 1, wherein the capture bed is an ion exchange resin bed.

16. The method of claim 1, wherein the capture bed comprises powder, granules, beads, pellets, cloths, felts, nonwoven fabrics, or composites comprising a material selected from carbon, nitrogen-doped carbon, boron-doped carbon, charcoal, graphite, biochar, coke, carbon black, or any combination thereof.

17. The method of claim 16, wherein the capture bed comprises activated charcoal powder, granules, pellets, beads, or any combination thereof.

18. The method of claim 1, wherein the capture bed comprises activated carbon having an average surface area of from about 100 $m^2/g$ to about 2000 $m^2/g$.

19. The method of claim 1, wherein the capture bed has a conductivity of from about 0.01 S/cm to about 100 S/cm.

20. The method of claim 1, wherein the capture bed is surface-modified with functional groups selected from the group consisting of an acid, a hydroxide, a chloride, a bromide, a fluoride, an ether, an epoxide, a quinone, a ketone, an aldehyde, a pyrrole, a thiophene, and any combination thereof.

21. The method of claim 1, wherein the capture bed further comprises a binder dispersed in the capture bed.

22. The method of claim 1, wherein the vessel is a pipe, column, or tank.

23. The method of claim 1, wherein the aqueous wash liquid comprises untreated contaminated aqueous mixture.

24. The method of claim 1, wherein the aqueous wash liquid comprises a $C_{1-5}$ alcohol.

25. The method of claim 1, wherein the aqueous wash liquid further comprises an antifreeze agent that lowers the freezing point of the aqueous wash liquid, and wherein the antifreeze agent is selected from the group consisting of propylene glycol, polypropylene glycol, polyethylene glycol, glycerol, polyvinyl alcohol, carboxymethylcellulose, ribose, sucrose, glucose, rhamnose, xylose, fructose, raffinose, stachyose, hydroxyethyl starches, maltodextrin, cellodextrins and any mixture thereof.

26. The method of claim 1, wherein the aqueous wash liquid further comprises one or more additives selected from the group consisting of acetic acid, propanoic acid, octanoic acid, glycolic acid, citric acid, ethylenediaminetetraacetic acid (EDTA), a water-soluble fatty acid, a salt of the aforementioned acids, and any mixture thereof.

27. The method of claim 1, further comprising flowing an aqueous rinse liquid through the vessel, wherein the rinse liquid comprises one or more additives selected from the group consisting of acetic acid, propanoic acid, octanoic acid, glycolic acid, citric acid, ethylenediaminetetraacetic acid (EDTA), a water-soluble fatty acid, a salt of the aforementioned acids, and any mixture thereof.

28. A method of regenerating a capture bed comprising:

providing a vessel that houses a capture bed having one or more ionic contaminants bound to the capture bed, wherein the one or more ionic contaminants are per- and polyfluoroalkyl substances (PFAS), and flowing an aqueous wash liquid through the vessel, wherein the aqueous wash liquid comprises a counter ion that binds to the ionic contaminant forming an aggregate contaminant phase, and wherein the counter ion is a cation selected from $Ca^{2+}$, $Mg^{2+}$, $Zn^{2+}$, $Sr^{2+}$, $Al^{3+}$, $B^{3+}$, or $Fe^{3+}$; or an anion selected from a phosphate, a sulfate, or a borate.

29. The method of claim 28, further comprising applying a voltage to an electrode in electrical contact with the capture bed, such that the one or more ionic contaminants bound to the capture bed is released from the capture bed and is washed from the capture bed via the aqueous wash liquid.

30. The method of claim 29, further comprising removing the aggregate contaminant phase from the aqueous wash liquid.

31. The method of claim 29, wherein the aggregate contaminant phase separates from the aqueous wash liquid by precipitation.

32. The method of claim 31, further comprising modulating the pH of the aqueous wash liquid to cause the aggregate contaminant phase to precipitate from the aqueous wash liquid.

33. The method of claim 28, further comprising contacting the released ionic contaminant in the aqueous wash liquid with a stationary ion source, such that the ionic contaminant is bound to the stationary ion source and is thereby removed from the aqueous wash liquid.

* * * * *